United States Patent
Benveniste

(10) Patent No.: US 7,983,271 B2
(45) Date of Patent: *Jul. 19, 2011

(54) TIERED CONTENTION MULTIPLE ACCESS (TCMA): A METHOD FOR PRIORITY-BASED SHARED CHANNEL ACCESS

(75) Inventor: Mathilde Benveniste, South Orange, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 583 days.

This patent is subject to a terminal disclaimer.

(21) Appl. No.: 11/507,226

(22) Filed: Aug. 21, 2006
(Under 37 CFR 1.47)

(65) Prior Publication Data
US 2007/0019665 A1    Jan. 25, 2007

Related U.S. Application Data

(63) Continuation of application No. 09/985,257, filed on Nov. 2, 2001, now Pat. No. 7,095,754.

(60) Provisional application No. 60/278,744, filed on Mar. 27, 2001, provisional application No. 60/257,983, filed on Dec. 27, 2000, provisional application No. 60/256,337, filed on Dec. 19, 2000, provisional application No. 60/254,544, filed on Dec. 12, 2000, provisional application No. 60/249,254, filed on Nov. 17, 2000, provisional application No. 60/245,186, filed on Nov. 3, 2000.

(51) Int. Cl.
*H04L 12/56* (2006.01)
(52) U.S. Cl. .................. 370/395.4; 370/395.21
(58) Field of Classification Search .................. 370/445, 370/447, 448, 395.2–395.43
See application file for complete search history.

(56) References Cited

U.S. PATENT DOCUMENTS

| | | | |
|---|---|---|---|
| 5,142,533 A | | 8/1992 | Crisler et al. |
| 5,185,739 A | | 2/1993 | Spear |
| 5,297,143 A | * | 3/1994 | Fridrich et al. ............... 370/445 |
| 5,329,531 A | | 7/1994 | Diepstraten et al. |
| 5,353,287 A | | 10/1994 | Kuddes et al. |

(Continued)

FOREIGN PATENT DOCUMENTS

| EP | 0994604 A2 | 4/2000 |
|---|---|---|
| WO | WO 03-039054 A2 | 5/2003 |

OTHER PUBLICATIONS

"Amendment- Radio Equipment and Systems (RES); High Performance Radio Local Area Network (HIPERLAN) Type 1; Functional Specification", ETSI, ETS 300 652, May 1997, pp. 1-21.

(Continued)

*Primary Examiner* — Thai D Hoang

(57) ABSTRACT

Quality of Service (QoS) support is provided by a Tiered Contention Multiple Access (TCMA) distributed medium access protocol that schedules transmission of different types of traffic based on their service quality specifications. In one embodiment, a wireless station is supplied with data from a source having a lower QoS priority QoS(A), such as file transfer data. Another wireless station is supplied with data from a source having a higher QoS priority QoS(B). Each wireless station can determine the urgency class of its pending packets according to a scheduling algorithm. There are several urgency classes which indicate the desired ordering. Pending packets in a given urgency class are transmitted before transmitting packets of a lower urgency class by relying on class-differentiated urgency arbitration times (UATs), which are the idle time intervals required before the random backoff counter is decreased.

25 Claims, 20 Drawing Sheets

U.S. PATENT DOCUMENTS

| | | | |
|---|---|---|---|
| 5,355,375 | A | 10/1994 | Christensen |
| 5,416,780 | A | 5/1995 | Patel |
| 5,636,223 | A | 6/1997 | Reardon et al. |
| 5,644,576 | A | 7/1997 | Bauchot et al. |
| 5,682,381 | A | 10/1997 | Sekihata et al. |
| 5,742,592 | A * | 4/1998 | Scholefield et al. .......... 370/329 |
| 5,828,663 | A | 10/1998 | Ikegami |
| 5,852,405 | A | 12/1998 | Yoneda et al. |
| 5,852,723 | A | 12/1998 | Kalkunte et al. |
| 5,892,769 | A | 4/1999 | Lee |
| 5,987,033 | A | 11/1999 | Boer et al. |
| 5,999,818 | A | 12/1999 | Gilbert et al. |
| 6,055,578 | A | 4/2000 | Williams et al. |
| 6,067,291 | A | 5/2000 | Kamerman et al. |
| 6,078,591 | A | 6/2000 | Kalkunte |
| 6,343,071 | B1 | 1/2002 | Lansford |
| 6,469,991 | B1 | 10/2002 | Chuah |
| 6,473,414 | B1 | 10/2002 | Hartley et al. |
| 6,563,790 | B1 | 5/2003 | Yu et al. |
| 6,594,240 | B1 | 7/2003 | Chuah et al. |
| 6,674,765 | B1 * | 1/2004 | Chuah et al. .................. 370/458 |
| 7,020,139 | B2 | 3/2006 | Kalkunte et al. |
| 7,027,462 | B2 | 4/2006 | Benveniste |
| 7,095,754 | B2 | 8/2006 | Benveniste |
| 7,145,871 | B2 | 12/2006 | Levy et al. |
| 7,274,708 | B2 | 9/2007 | Benveniste |
| 7,573,820 | B2 | 8/2009 | Krishnaswamy et al. |
| 2001/0024434 | A1 | 9/2001 | Ayyagari et al. |
| 2002/0061031 | A1 | 5/2002 | Sugar et al. |
| 2002/0089959 | A1 | 7/2002 | Fischer et al. |
| 2002/0152324 | A1 | 10/2002 | Sherman |
| 2003/0103521 | A1 | 6/2003 | Raphaeli et al. |
| 2005/0053029 | A1 | 3/2005 | Lee et al. |
| 2007/0019664 | A1 | 1/2007 | Benveniste |
| 2007/0019665 | A1 | 1/2007 | Benveniste |
| 2007/0038752 | A1 | 2/2007 | Jorgensen |
| 2007/0110087 | A1 | 5/2007 | Abel et al. |

OTHER PUBLICATIONS

"Broadband Radio Access Network (BRAN); HIPERLAN type 2; System Overview", ETSI, ETSI TR 101 683 VI.1.1 (Feb. 2000), Technical Report, pp. 1-19.

"Broadband Radio Access Networks (BRAN); HIPERLAN Type 2; Data Link Control (DLC) Layer; Part 4: Extension for Home Environment" ETSI, ETSI TS 101 761-4 VI.2.1. (Dec. 2000), pp. 1-125.

Diepstraten, "Wireless Access Method and Physical Specification", IEEE, IEEE P802.11-93/70, May 1993, pp. 1-16 slides 1-6.

White, "Wireless Access Method and Physical Layer Specifications", IEEE, IEEE P802.11-93/159, Sep. 1993, pp. 1-8.

Diepstraten et al. Wireless Access Method and Physical Specification, IEEE, IEEE O802.11-94/150, Jul. 1994, pp. 1-12, Slides 1-11 & 1-23.

Andrew S. Tanenbaum, *Computer Networks*, 3ed, 1996 Prentice Hall, Chapter 4, "The Medium Access Sublayer", pp. 243-338.

James L. Massey, "Collision-Resolution Algorithms and Random-Access Communications, "Multi-User Communication Systems, edited by G. Long, Universita' di Trieste, 1981 by CISM, Udine, pp. 73-137.

Leonard Kleinrock et al., "Packet Switching in Radio Channels: Part I—Carrier Sense Multiple-Access Modes and Their Throughput-Delay Characteristics," IEEE Transactions on Communications, vol. Com-23, No. 12, Dec. 1975, pp. 1400-1416.

Ronald L. Rivest, "Network Control by Bayesian Broadcast, " IEEE Transaction on Information Theory, vol. IT-33, May 1987, pp. 323-328.

Phil Karn, "MACA-A New Channel Access Method for Packet Radio," $9^{th}$ Computer Networking Conference, ARRL/CRRL Amateur Radio, 1990, pp. 134-140.

Vaduvur Bharghavan et al., "MACAU: A Media Access Protocol for Wireless LAN's", Computer Communication Review, vol. 24, No. 4, Oct. 1994, pp. 212-225.

The Bluetooth Special Interest group, Specification of Bluetooth System, Version 1.1, Feb. 22, 2001, pp. 41-47.

IEEE Std. 802.11, "Local and Metropolitan Area Networks", 1997, p. 92.

Bononi, L., et al. "Design and Performance Evaluation of an Asymptotically Optimal Backoff Algorithm for IEEE 802.11 Wireless LANs", Proceeding of the $33^{rd}$ Hawaii International Conference on System Sciences—2000, Jan. 4-7, 2000, pp. 1-10.

Deng, Dr-Jiunn, et al. "A Priority Scheme for IEEE 802.11 DCF Access Method", IEICE Trans. Communication, Jan. 1999, vol. E82-B, No. 1.

* cited by examiner

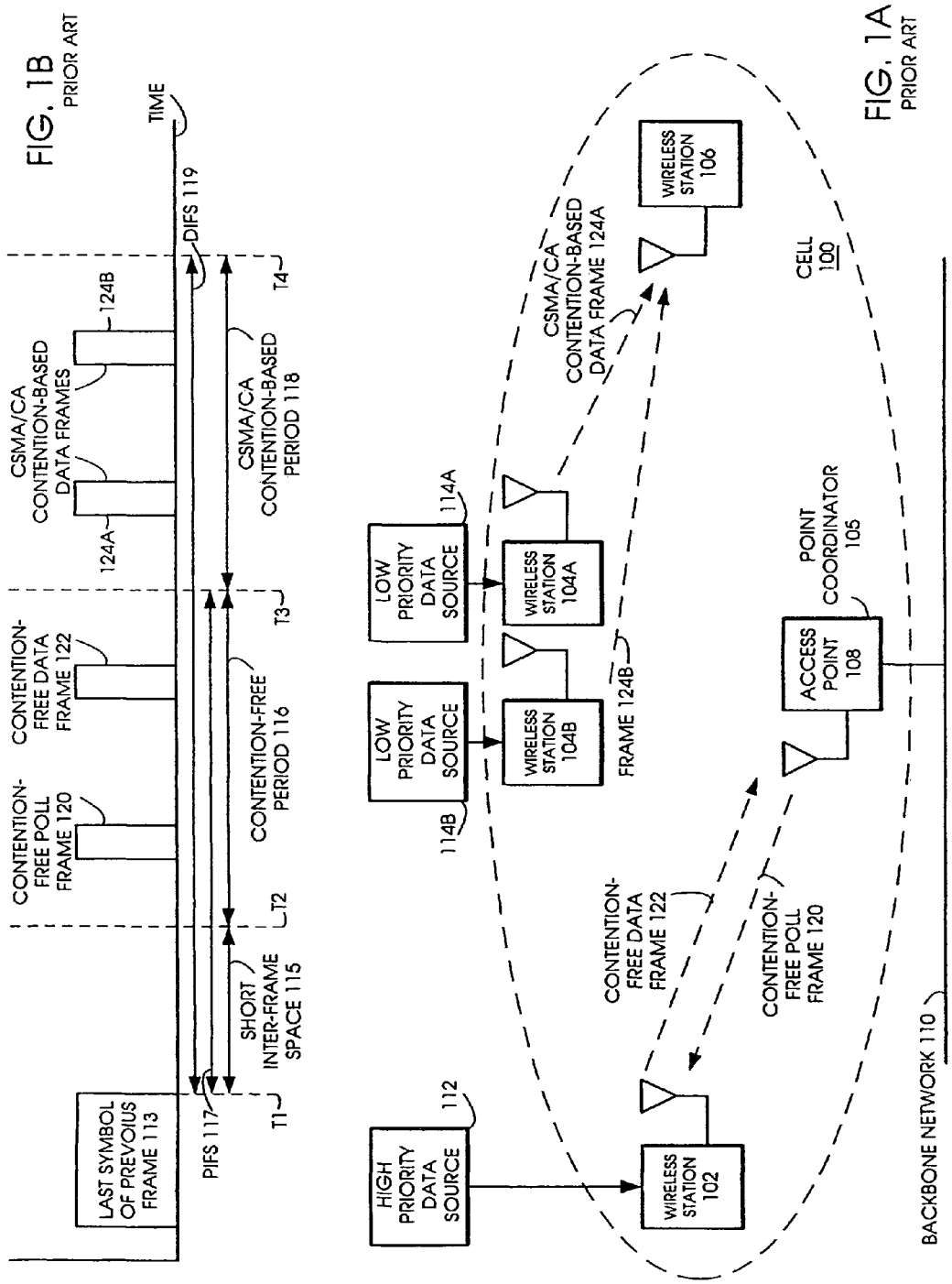

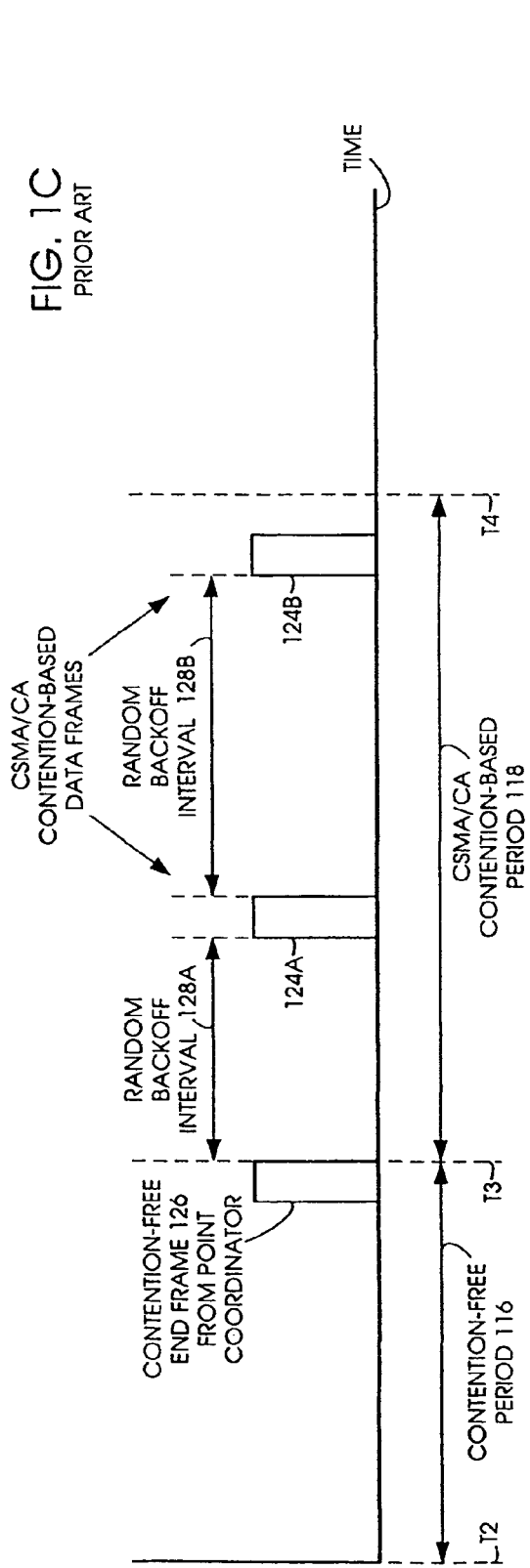
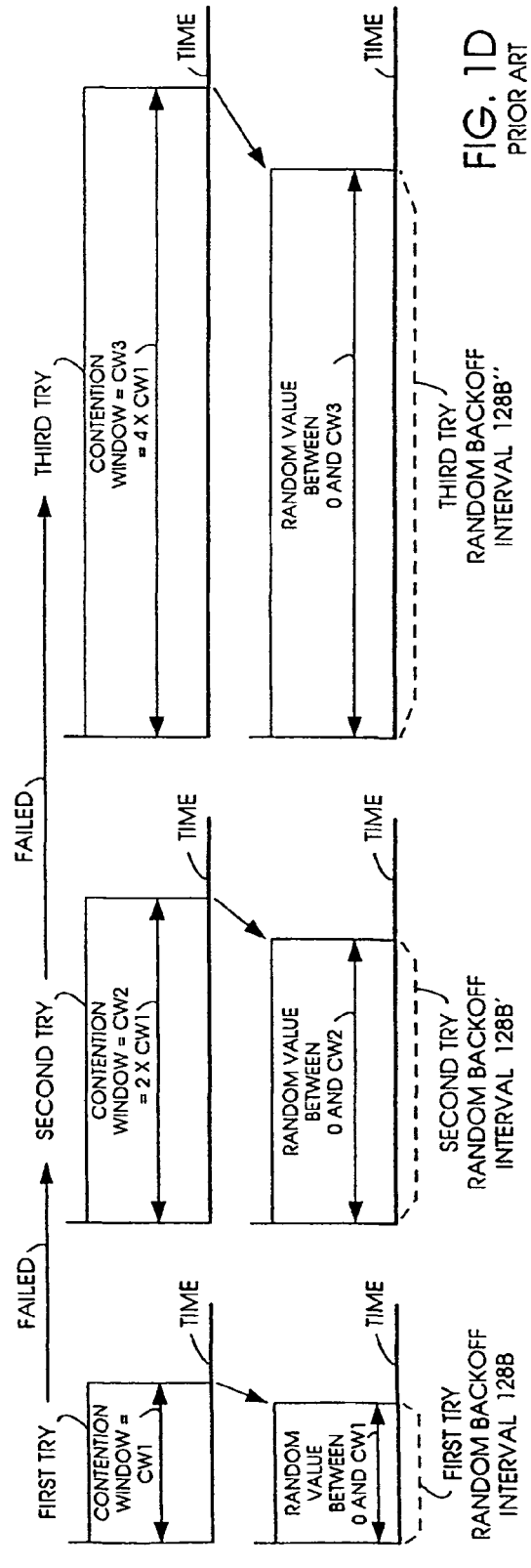
FIG. 1C PRIOR ART
FIG. 1D PRIOR ART

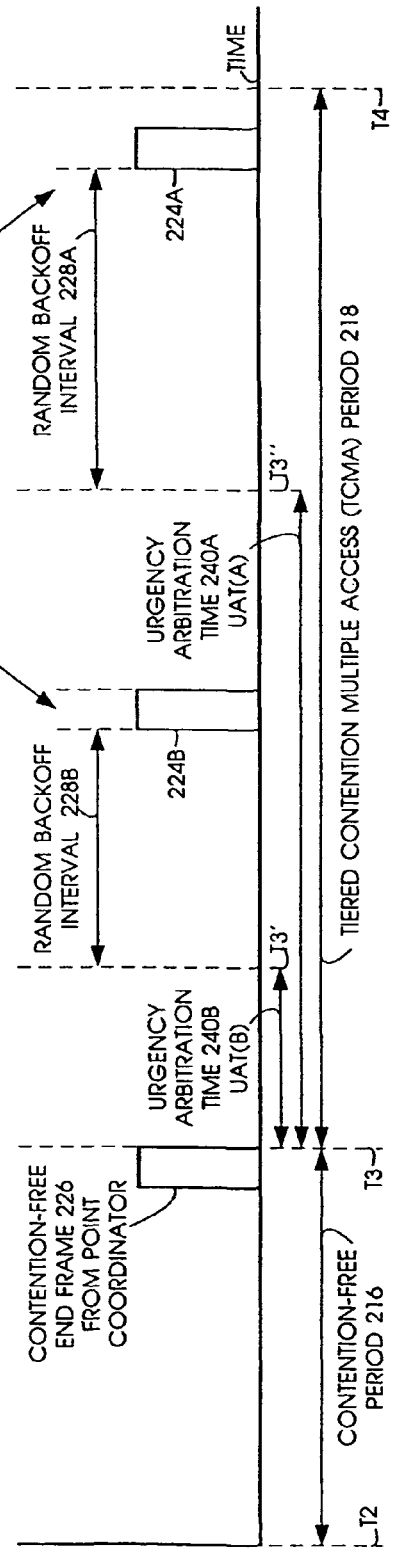
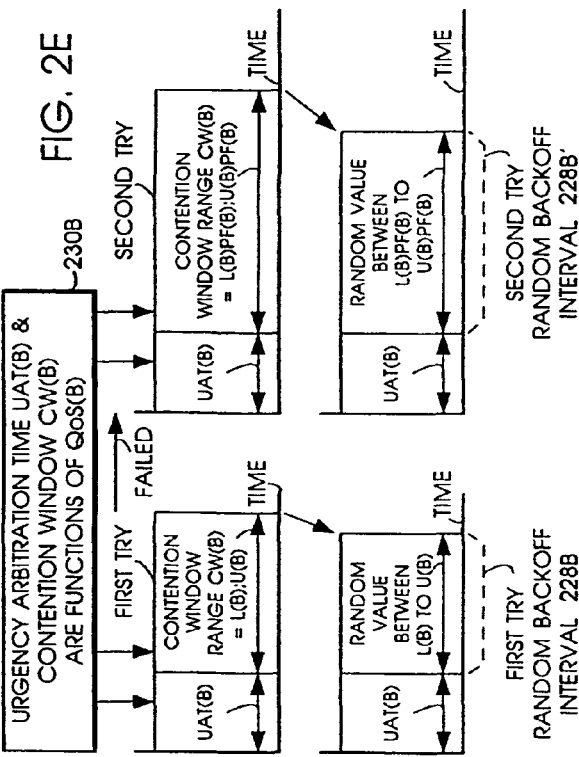
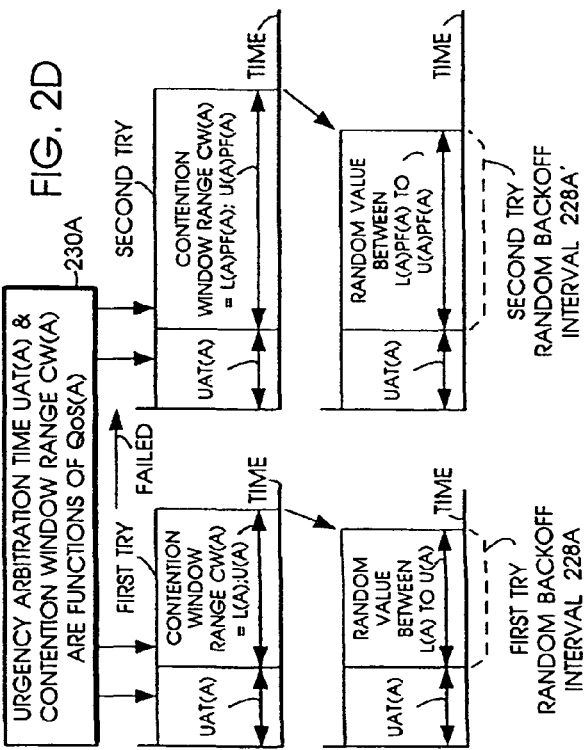

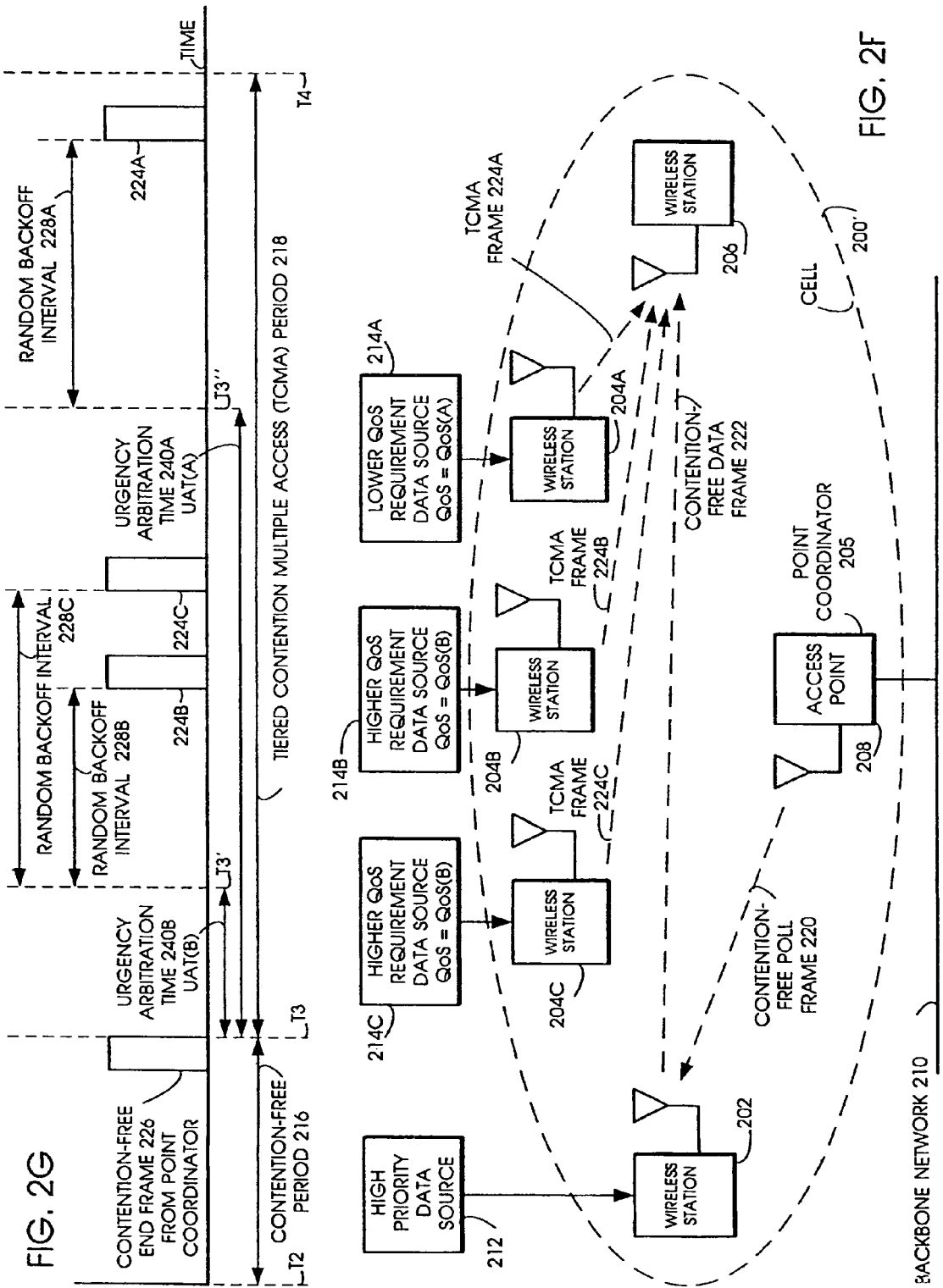

FIG. 6

CONGESTION IS ESTIMATED FOR EACH URGENCY CLASS THROUGH THE INTRODUCTION OF NEW FIELD IN ALL RESERVATION MESSAGES (INCLUDING REQUEST TO SEND (RTS) AND CLEAR TO SEND (CTS)) AND HEADERS OF TRANSMITTED PACKETS INDICATING THE NUMBER OF TRANSMISSION ATTEMPTS

| RESERVATION MESSAGES (INCLUDING REQUEST TO SEND (RTS) AND CLEAR TO SEND (CTS)) AND HEADERS OF TRANSMITTED PACKETS | FEEDBACK ON THE SUCCESS OR FAILURE OF A TRANSMISSION ATTEMPT | THE NUMBER OF RE-TRANSMISSIONS ATTEMPTED BY A NODE | THE NUMBER OF RE-TRANSMISSIONS ATTEMPTED BY EACH NEIGHBOR OF A NODE | THE AGE OF SUCH RETRIALS | A SEPARATE NUMBER OF TRANSMISSION ATTEMPTS IS REMEMBERED OR BROADCAST FOR EACH URGENCY CLASS |

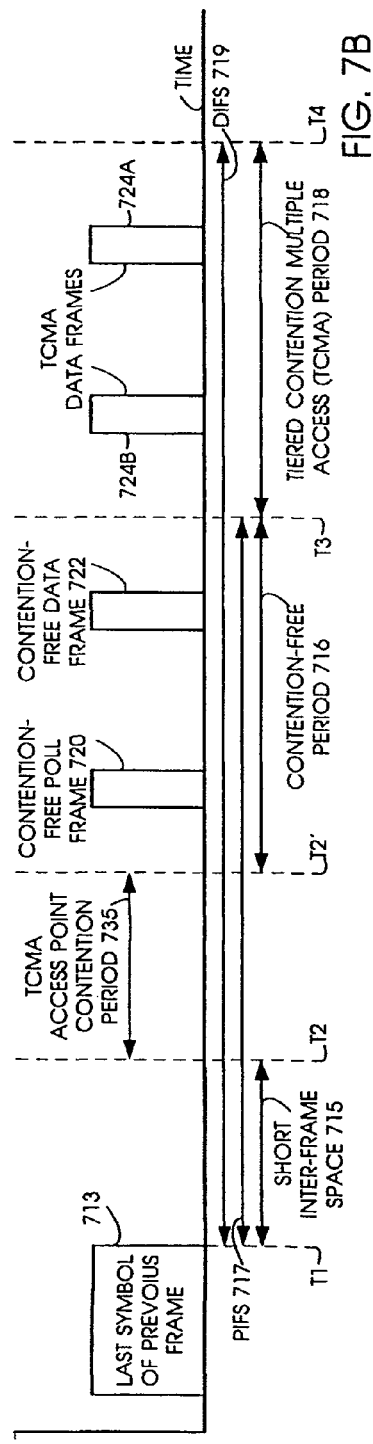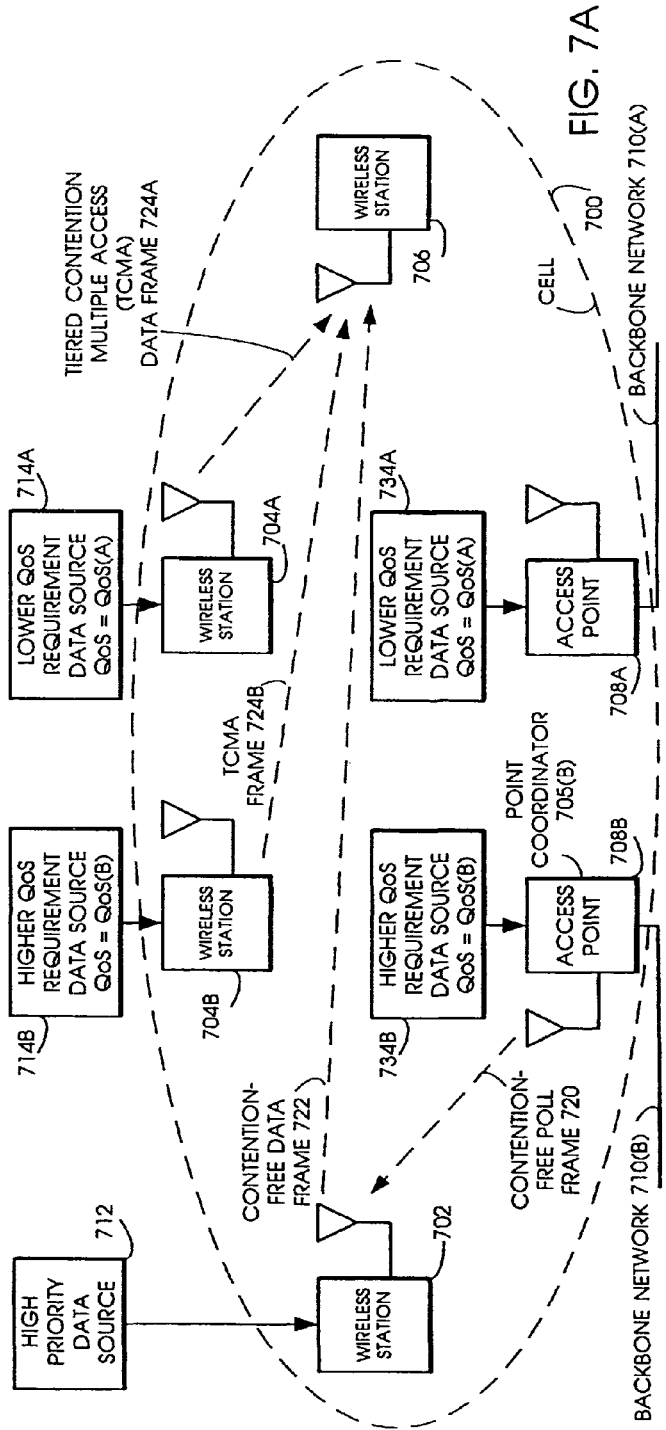

Average delay by traffic category

DCF

TCMA (AIFS Differentiation)

Simulation Time (sec)

Delay and jitter for a single call

DCF

TCMA (AIFS Differentiation)

Simulation Time (sec)

Average delay by traffic category
DCF

TCMA (AIFS Differentiation) cwmin(0)=32

TCMA with Persistence Factors: (0.5, 2)

cwmin(0)=64

Simulation Time (sec)

Delay and jitter for a single call

DCF

TCMA (AIFS Differentiation) cwmin(0)=32

TCMA with Persistence Factors: (0.5, 2)

cwmin(0)=64

Simulation Time (sec)

Obsolete frames [MAC dwell time > 20 ms]
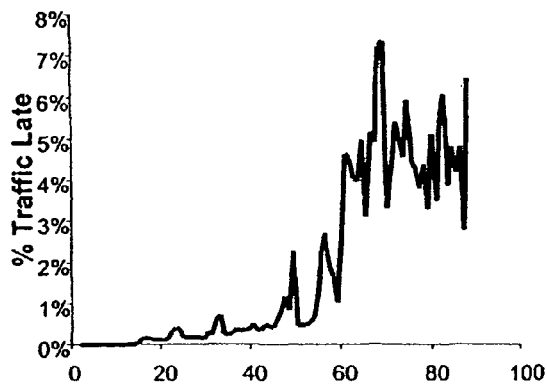
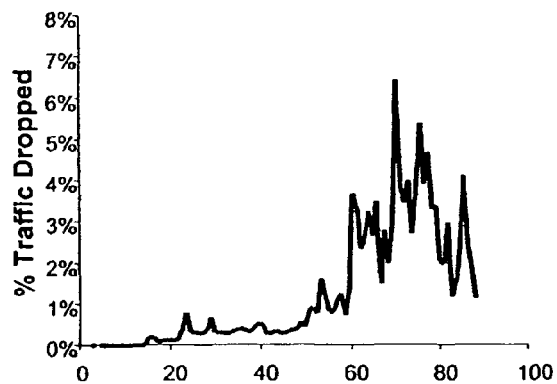

Without dropping Delayed frames
Dropping voice frames with MSDULifetime > 20 ms
Delay and jitter for a single call (sec)
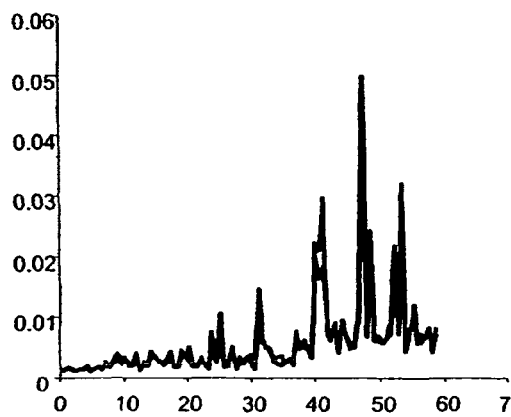
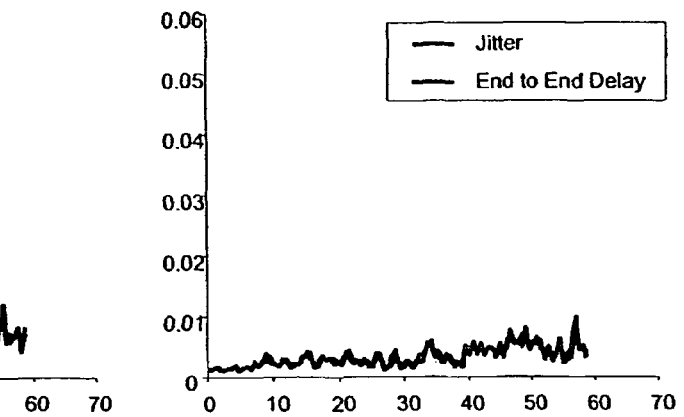
Figure 13C
Simulation Time (sec)
Figure 13D

TIERED CONTENTION MULTIPLE ACCESS (TCMA): A METHOD FOR PRIORITY-BASED SHARED CHANNEL ACCESS

CROSS REFERENCE TO RELATED APPLICATIONS

This application is a continuation of U.S. patent application Ser. No. 09/985,257 filed on Nov. 2, 2001, now U.S. Pat. No. 7,095,754 entitled "TIERED CONTENTION MULTIPLE ACCESS (TCMA): A METHOD FOR PRIORITY-BASED SHARED CHANNEL ACCESS" (now allowed), which claims priority from U.S. Provisional Patent Application Nos. 60/245,186, filed Nov. 3, 2000; 60/249,254, filed Nov. 17, 2000; 60/254,544, filed Dec. 12, 2000; 60/256,337, filed Dec. 19, 2000; 60/257,983, filed Dec. 27, 2000; and 60/278,744, filed Mar. 27, 2001, all of which are incorporated herein by reference.

FIELD OF THE INVENTION

The invention disclosed broadly relates to telecommunications methods and more particularly relates to Quality of Service (QoS) management in multiple access packet networks.

BACKGROUND OF THE INVENTION

Wireless Local Area Networks (WLANs)

Wireless local area networks (WLANs) generally operate at peak speeds from 1 to 54 Mbps and have a typical range of 100 meters. Single-cell Wireless LANs, as shown in FIG. 1A, are suitable for small single-floor offices or stores. A station in a wireless LAN can be a personal computer, a bar code scanner, or other mobile or stationary device that uses a wireless network interface card (NIC) to make the connection over the RF link to other stations in the network. The single-cell wireless LAN 100 of FIG. 1A provides connectivity within radio range between wireless stations 102, 104A, 104B, 106, and 108. Access point 108 allows connections via the backbone network 110 to wired network-based resources, such as servers. A single-cell wireless LAN can typically support several users and still keep network access delays at an acceptable level. Multiple-cell wireless LANs provide greater range than does a single-cell, by means of a set of access points and a wired network backbone to interconnect a plurality of single-cell LANs. Multiple-cell wireless LANs can cover larger multiple-floor buildings. A mobile appliance (e.g., laptop computer, SmartPhone, or data collector) with the appropriate integrated chip set or a wireless network interface card (NIC) can roam within the coverage area while maintaining a live connection to the backbone network 11.

Of the multitude of wireless LAN specifications and standards, IEEE 802.11 technology has emerged as a dominant force in the enterprise WLAN market over the past years. The WiFi group, commonly known as the Wireless Ethernet Compatibility Alliance (WECA) has led its development. Supporters include 3 Com, Alantro Communications, Apple, Artem, Breezecom, Cabletron, Cisco (Aironet), Compaq, Dell, ELSA, Enterasys, Fujitsu, Intermec, Intel, Intersil, Lucent/Agere, MobileStar, Nokia, Samsung, ShareWave, Symbol, Telxon, WavePort and Zoom.

IEEE 802.11b is the newest 802.11 standard—finalized in September 1999—which is an 11 Mbps high rate DSSS (direct sequence spread spectrum) standard for wireless networks operating in the 2.4 GHz band. 802.11b high-rate products started shipping in late 1999 Task Group E, a MAC enhancements study group recently completed a feasibility study on integrating Quality of Service (QoS) and security into the standard.

Open Air was the first wireless LAN standard, pioneered by the Wireless Interoperability Forum (WLIF), with Proxim as its main proponent. It employs FHSS (frequency hopped spread spectrum) in the 2.4 GHz band. A recent FCC ruling allowed use of 5 MHz channels, up from its previous 1 MHz, in the 2.4 GHz frequency. With wideband frequency hopping (WBFH) data rates of 10 Mbps are possible.

HomeRF was designed specifically for the home networking market. As with Open Air, WBFH permits data transmission speeds to extend to 10 Mbps (up from 2 Mbps), which makes HomeRF more competitive with 802.11 technology. However, although HomeRF has significant backing from Proxim, Compaq, Motorola, and others.

Bluetooth is aimed at the market of low-power, short-range, wireless connections used for remote control, cordless voice telephone communications, and close-proximity synchronization communications for wireless PDAs/hand-held PCs and mobile phones. It has been confused on occasion as a pure-play WLAN standard, which it is not.

IEEE 802.11a is the 5 GHz extension to 802.11b, will provide speeds as high as 54 Mbps at a range less than half of 802.11b. It will prove attractive in high traffic-density service areas, where reduction of the 802.11b power (and hence range) to increase re-use is not adequate. With QoS enhancements similar to those pursued for 802.11b presently, it will appeal especially to users familiar with the 802.11 architecture.

HiperLAN/2 is the European (and global) counterpart to the "American" 802.11a standard first ratified in 1996 (as HiperLAN/1) by the European Telecommunications Standards Institute (ETSI). HiperLAN/2 has QoS features.

The unveiling of 802.11g, the 22 Mbps extension to 802.11b, will give further life to the 2.4 GHz band in the near term, where 802.11b operates. Much like 10/100 Mbps Ethernet wired LANs, the new standard will provide backward compatibility to 802.11b networks.

Wireless LAN specifications and standards include the IEEE 802.11 Wireless LAN Standard and the HIPERLAN Type 1 and Type 2 Standards. The IEEE 802.11 Wireless LAN Standard is published in three parts as IEEE 802.11-1999; IEEE 802.11a-1999; and IEEE 802.11b-1999, which are available from the IEEE, Inc. web site http://grouper.ieee.org/groups/802/11. An overview of the HIPERLAN Type 1 principles of operation is provided in the publication HIPERLAN Type 1 Standard, ETSI ETS 300 652, WA2 December 1997. An overview of the HIPERLAN Type 2 principles of operation is provided in the Broadband Radio Access Networks (BRAN), HIPERLAN Type 2; System Overview, ETSI TR 101 683 VI.I.1 (2000-02) and a more detailed specification of its network architecture is described in HIPERLAN Type 2, Data Link Control (DLC) Layer; Part 4. Extension for Home Environment, ETSI TS 101 761-4 V1.2.1 (2000-12). A subset of wireless LANs is Wireless Personal Area Networks (PANs), of which the Bluetooth Standard is the best known. The Bluetooth Special Interest Group, Specification of the Bluetooth System, Version 1.1, Feb. 22, 2001, describes the principles of Bluetooth device operation and communication protocols.

Collision Avoidance Techniques

Four general collision avoidance approaches have emerged: [1] Carrier Sense Multiple Access (CSMA) [see F. Tobagi and L. Kleinrock, "Packet Switching in Radio Channels: Part I—Carrier Sense Multiple Access Models and their Throughput Delay Characteristics", IEEE Transactions on Communications, Vol 23, No 12, Pages 1400-1416, 1975], [2] Multiple Access Collision Avoidance (MACA) [see P. Karn, "MACA—A New Channel Access Protocol for Wireless Ad-Hoc Networks", Proceedings of the ARRL/CRRL Amateur Radio Ninth Computer Networking Conference, Pages 134-140, 1990], [3] their combination CSMA/CA, and [4] collision avoidance tree expansion.

CSMA allows access attempts after sensing the channel for activity. Still, simultaneous transmit attempts lead to collisions, thus rendering the protocol unstable at high traffic loads. The protocol also suffers from the hidden terminal problem.

The latter problem was resolved by the MACA protocol, which involves a three-way handshake [P. Karn, supra]. The origin node sends a request to send (RTS) notice of the impending transmission; a response is returned by the destination if the RTS notice is received successfully; and the origin node proceeds with the transmission. This protocol also reduces the average delay as collisions are detected upon transmission of merely a short message, the RTS. With the length of the packet included in the RTS and echoed in the clear to send (CTS) messages, hidden terminals can avoid colliding with the transmitted message. However, this prevents the back-to-back re-transmission in case of unsuccessfully transmitted packets. A five-way handshake MACA protocol provides notification to competing sources of the successful termination of the transmission. [See V. Bharghavan, A. Demers, S. Shenker, and L. Zhang, "MACAW: A media access protocol for wireless LANs", SIGCOMM '94, Pages 212-225, ACM, 1994.]

CSMA and MACA are combined in CSMA/CA, which is MACA with carrier sensing, to give better performance at high loads. A four-way handshake is employed in the basic contention-based access protocol used in the Distributed Coordination Function (DCF) of the IEEE 802.11 Standard for Wireless LANs. [See IEEE Standards Department, D3, "Wireless Medium Access Control and Physical Layer WG," IEEE Draft Standard P802.11 Wireless LAN, January 1996.]

Collisions can be avoided by splitting the contending terminals before transmission is attempted. In the pseudo-Bayesian control method, each terminal determines whether it has permission to transmit using a random number generator and a permission probability "p" that depends on the estimated backlog. [See R.L. Rivest, "Network control by Bayesian Broadcast", IEEE Trans. Inform. Theory, Vol IT 25, pp. 505-515, September 1979.]

To resolve collisions, subsequent transmission attempts are typically staggered randomly in time using the following two approaches: binary tree and binary exponential backoff.

Upon collision, the binary tree method requires the contending nodes to self-partition into two groups with specified probabilities. This process is repeated with each new collision. The order in which contending nodes transmit is determined either by serial or parallel resolution of the tree. [See J. L. Massey, "Collision-resolution algorithms and random-access communications", in Multi-User Communication Systems, G. Longo (ed.), CISM Courses and Lectures No. 265, New York: Springer 1982, pp. 73-137.]

In the binary exponential backoff approach, a backoff counter tracks the number of idle time slots before a node with pending packets attempts to seize the channel. A contending node initializes its backoff counter by drawing a random value, given the backoff window size. Each time slot the channel is found idle, the backoff counter is decreased by 1 and transmission is attempted upon expiration of the backoff counter. The window size is doubled every time a collision occurs, and the backoff countdown starts again. [See A. Tanenbaum, Computer Networks, $3^{rd}$ ed., Upper Saddle River, N.J., Prentice Hall, 1996.] The Distributed Coordination Function (DCF) of the IEEE 802.11 Standard for Wireless LANs employs a variant of this contention resolution scheme, a truncated binary exponential backoff, starting at a specified window and allowing up to a maximum backoff range below which transmission is attempted. [IEEE Standards Department, D3, supra] Different backoff counters may be maintained by a contending node for traffic to specific destinations. [Bharghavan, supra]

In the IEEE 802.11 Standard, the channel is shared by a centralized access protocol—the Point Coordination Function (PCF)—which provides contention-free transfer based on a polling scheme controlled by the access point (AP) of a basic service set (BSS). [IEEE Standards Department, D3, supra] The centralized access protocol gains control of the channel and maintains control for the entire contention-free period by waiting a shorter time between transmissions than the stations using the Distributed Coordination Function (DCF) access procedure.

IEEE 802.11 Wireless LAN Overview

The IEEE 802.11 Wireless LAN Standard defines at least two different physical (PHY) specifications and one common medium access control (MAC) specification. The IEEE 802.11(a) Standard is designed to operate in unlicensed portions of the radio spectrum, usually the 5 GHz Unlicensed-National Information Infrastructure (U-NII) band. It uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates.

802.11 Architecture Components

The IEEE 802.11 Wireless LAN Standard describes the following components. The station (STA) is any wireless device with conformant 802.11 interfaces to the wireless medium. A Basic Service Set (BSS) consists of two or more wireless nodes, or STAs, which have recognized each other and have established communications. In the most basic form, stations communicate directly with each other on a peer-to-peer level. When stations can communicate only among themselves, we say we have an Independent Basic Service Set (IBSS). This type of arrangement is commonly referred to as an ad hoc network. It is often formed on a temporary basis. BSSs can communicate with one another and with other networks. The distribution system (DS) integrates different BSS into a network; it may take any form, but it is typically a wired LAN. It provides address mapping. In most instances, the BSS contains an Access Point (AP). The AP is a station. The main function of an AP is to provide access to the distribution system. All communications between stations or between a station and a wired network client go through the AP. The AP is analogous to a base station used in cellular phone networks. AP's are not mobile, and form part of the wired network infrastructure. When an AP is present, stations do not communicate on a peer-to-peer basis. A multiple-cell wireless LAN using the IEEE 802.11 Wireless LAN Standard is an Extended Service Set (ESS) network. An ESS satisfies the needs of large coverage networks of arbitrary size and complexity. FIG. 1A illustrates the components of a WLAN.

Because of the way BSSs are set up in a plug-and-play manner, it is not uncommon for the coverage areas of two distinct BSSs to overlap.

802.11 MAC Functions

The purpose of the MAC protocol is to provide for the delivery of user data; fair access control; and privacy. Each wireless station and access point in an IEEE 802.11 wireless LAN implements the MAC layer service, which provides the capability for wireless stations to exchange MAC frames. The MAC frame transmits management, control, or data between wireless stations and access points. After a station forms the applicable MAC frame, the frame's bits are passed to the Physical Layer for transmission. The same MAC protocol serves all PHY specifications.

In the IEEE 802.11 Standard, the channel is shared through two access mechanisms: DCF and PCF. The distributed coordination function (DCF) is the basic media access control method for 802.11. It is mandatory for all stations. It is based on contention.

The point coordination function (PCF) is an optional extension to DCF. It is a contention-free centralized access protocol, especially useful for periodic time-sensitive services like cordless telephony. It is based on a polling scheme controlled by the access point (AP) of a basic service set. The centralized access protocol gains control of the channel and maintains control for the entire contention-free period by waiting a shorter time between transmissions than the stations using the DCF access procedure.

DCF Access Mechanism

The distributed coordination function (DCF) is the basic access method in 802.11 LANs. The PCF employs the DCF access mechanism to gain control of the channel. DCF uses Carrier Sense Multiple Access/Collision Avoidance (CSMA/CA). This requires each station to listen for other users and if busy postpone transmission by a random delay, known as backoff.

The backoff procedure in DCF relies on the ability of every station to 'hear' all other stations. But this is not always the case. It is possible for a station unable to hear the source of a transmission to interfere with the receipt of that transmission. This is known as the 'hidden node' problem. The RTS/CTS exchange can be used to combat this problem. RTS/CTS is also a mechanism for reserving the channel for point-to-point transmissions; it involves the exchange of messages between the origin and destination.

The source of the transmission sends an RTS frame, which may, or may not, be heard by a hidden node. The RTS frame contains a 'duration' field that specifies the period of time for which the medium is reserved. The NAV of a STA is set by the duration field. The NAV is set by all stations detecting the RTS frame. Nodes other than the destination set the NAV at this value and refrain from accessing the medium until the NVA expires. Upon receipt of the RTS, the destination node responds with a CTS frame. It, too, contains a 'duration' field specifying the remaining period of time for which the medium is reserved. A station within interfering range from the destination, which may not hear the RTS, will detect the CTS and update its NAV accordingly. The NAV provides protection through the ACK. The NAV serves as a 'virtual' carrier sense mechanism. Thus, collision is avoided even though some stations are hidden from others.

The RTS/CTS procedure is invoked optionally. As a channel reservation mechanism, the RTS/CTS exchange is efficient only for longer frames because of the extra overhead involved.

In order to increase the probability of successful transfer across the medium, frames are fragmented into smaller ones. A MAC service data unit (MSDU) is partitioned into a sequence of smaller MAC protocol data units prior to transmission. DCF transmits MSDUs as independent entities, thus providing best-effort connectionless user data transport.

DCF Backoff Procedure

If the channel has been idle for a time period of length DIFS (defined below) when a new frame arrives, the station may transmit immediately. However, if it is busy, each station waits until transmission stops, and then enters into a random backoff procedure. Deferring transmission by a random delay tends to prevent multiple stations from seizing the medium immediately after a preceding transmission completes. A backoff delay is chosen randomly from a range of integers known as the contention window. This delay measures the total idle time for which a transmission is deferred. It is expressed in units of time slots.

The CSMA/CA protocol minimizes the chance of collisions between stations sharing the medium, by waiting a random backoff interval 128A or 128B of FIG. 1C, if the station's sensing mechanism indicates a busy medium when a frame arrives. The period of time immediately following completion of the transmission is when the highest probability of collisions occurs, as all stations with newly arrived frames will attempt to transmit. For example, stations 102, 104B, and 106 may be waiting for the medium to become idle while station 104A is transmitting, and stations 102, 104B, and 106 will attempt to transmit at the same time, once station 104A stops. Once the medium is idle, CSMA/CA protocol causes each station to delay its transmission by a random backoff time. For example, station 104B delays its transmission by a random backoff time 128B, which defers station 104B from transmitting its frame 124B, thereby minimizing the chance it will collide with those from other stations 102 and 106, which have also selected their backoff times randomly.

As shown in FIG. 1D, the CSMA/CA protocol computes the random backoff time 128B of station 104B as the product of a constant, the slot time, times a pseudo-random number RN which has a range of values from zero to a contention window CW. The value of the contention window for the first try to access the network by station 104B is CW1, which yields the first try random backoff time 128B.

Backoff Countdown

An internal timer is set to the selected backoff delay. The timer is reduced by 1 for every time slot the medium remains idle. Backoff countdown is interrupted when the medium becomes busy. The timer setting is retained at the current reduced value for subsequent countdown. Backoff countdown may start or resume following a busy channel period only if the channel has been idle for time interval of length equal to DIFS. If the timer reaches zero, the station may begin transmission. The backoff procedure is illustrated in FIG. 1.

When a collision occurs, retransmission is attempted using binary exponential backoff, which refers to the process of increasing the range from which another backoff delay is drawn randomly. The contention window size is doubled with every transmission retry. This serves as a good mechanism for adapting to congestion because collisions are a result of congestion; with congestion a wider window is desirable. In the example in FIG. 1D, if the first try to access the network by station 104B fails, then the CSMA/CA protocol computes a new CW by doubling the current value of CW as CW2=CW1 times 2. As shown in FIG. 1D, the value of the contention window for the second try to access the network by station 104B is CW2, which yields the second try random backoff time 128B'. Binary exponential backoff provides a means of adapting the window size to the traffic load. Stations are not forced to wait very long before transmitting their frame in low traffic load. On the first or second attempt, a station will make a successful transmission. However, if the traffic load is high, the CSMA/CA protocol delays stations for longer periods to avoid the chance of multiple stations transmitting at the same time. If the second try to access the network by station 104B fails, then the CSMA/CA protocol computes a new CW by doubling again the current value of CW as CW3=CW1 times 4. As shown in FIG. 1D, the value of the contention window for the third try to access the network by station 104B is CW3, which yields the third try random backoff time 128B". The value of CW increases to relatively high values after successive retransmissions, under high traffic loads. This provides greater transmission spacing between stations waiting to transmit.

Inter-Frame Spaces

In addition to contending stations, the channel is accessed also by the PCF, and by other frames without contention. To prioritize transmissions or remove contention, special idle spaces are defined, the IFS (-Inter Frame Space), which are idle spaces required between frames. They are illustrated in FIG. 1B. Each interval defines the duration from the end of the last symbol of the previous frame 113 at time T1, to the beginning of the first symbol of the next frame. They are the following: The Short Interframe Space (SIFS) 115 allows some frames to access the medium without contention, such as an Acknowledgement (ACK) frame, a Clear to Send (CTS) frame, or a subsequent fragment burst of a previous data frame. These frames require expedited access to the channel. At any point in time there is a single frame needing transmission within this group, and if transmitted within a SIFS period, there will be no contention.

The PCF inter-frame space, PIFS, is next; it is used by the PCF to access the medium in order to establish a contention-free period. A contention-free period may be started before a DCF transmission can access the channel because PIFS is shorter than DIFS. The Priority Interframe Space 117 of FIG. 1B is used by the PCF to access the medium in order to establish contention-free period 116 starting at T2 and ending at T3. The point coordinator 105 in the access point 108 connected to backbone network 110 in FIG. 1A controls the priority-based Point Coordination Function (PCF) to dictate which stations in cell 100 can gain access to the medium. During the contention-free period 116, station 102 in FIG. 1A, for example, is directed by the access point 108 to transmit its data frame 122. The point coordinator 105 in the access point 108 sends a contention-free poll frame 120 to station 102, granting station 102 permission to transmit a single frame. All stations, such as stations 104A, 104B, and 106, in the cell 100 can only transmit during contention-free period 116 when the point coordinator grants them access to the medium. In this example, stations 104A and 104B, which have data sources 114A and 114B, must wait until the end of the contention-free period 116 at T3. This is signaled by the contention-free end frame 126 sent by the point coordinator in FIG. 1C. The contention-free end frame 126 is sent to identify the end of the contention-free period 116, which occurs when time expires or when the point coordinator has no further frames to transmit and no stations to poll.

DIFS (DCF inter-frame space) is the longest of the three. Transmissions other than ACKs must wait at least one DIFS before commencing. A contention-free session can be started by the PCF before a DCF transmission because DIFS is longer than PIFS. Upon expiration of a DIFS, the backoff timer begins to decrement. The distributed coordination function (DCF) Interframe Space 119 of FIG. 1B is used by stations 104A and 104B, for example, for transmitting data frames 124A and 124B, respectively, during the contention-based period 118. The DIFS spacing permits the PC of neighboring cells to access the channel before a DCF transmission by delaying the transmission of frames 124A and 124B to occur between T3 and T4 An Extended Interframe Space (EIFS) (not shown) goes beyond the time of a DIFS interval as a waiting period when a bad reception occurs. The EIEFS interval provides enough time for the receiving station to send an acknowledgment (ACK) frame.

PCF Access Mechanism

The Point Coordination Function (PCF) is an optional extension to DCF. In a single BSS, PCF provides contention-free access to accommodate time bounded, connection-oriented services such as cordless telephony. PCF involves a point coordinator (PC), which operates at the access point of the BSS. It employs contention-free polling. The PC gains control of the medium at regular time intervals through the DCF CSMA/CA protocol using PIFS for access priority over DCF transmissions. The PC also distributes information relevant to the PCF within Beacon Management frames.

The transmissions coordinated under the PCF experience no contention because control of the channel is maintained through the use of IEFS spaces shorter than or equal to PIFS. That is, all frame transmissions under the point coordination function may use an IEFS that is smaller than DIFS, the IEFS used for DCF transmissions. Point-coordinated traffic is also protected this way from contention with DCF transmissions in overlapping BSSs that operate on the same channel. The contention-free period is also protected by setting the network allocation vector (NAV) in stations.

The PC determines which station transmits when. First, the AP delivers broadcast data. Then, the PC polls STAs on the polling list to send their data. In order to use the channel efficiently, piggybacking of different types of frames, like data frames, ACKs and polls, is possible. For example, a PC data frame can be combined with a poll to a station. STA data frames can be combined with an ACK. A PC can combine an ACK to one station with data and a poll to another. One frame is transmitted per poll by a polled STA.

Stations are placed on the polling list when they associate or re-associate with a BSS, at their discretion. A station may opt not to be polled in order to save power.

Multi-BSS Environment

A BSS is an equivalent to a cell in a cellular system; the AP is equivalent to the base station. When multiple WLANs operate in the same physical space, they share the same wireless spectrum. Coordination of wireless spectrum use in multi-BSS systems is thus comparable to RF planning in a cellular system. But unlike in cellular systems, the RF planning problem in WLANs is made more difficult by the location of the APs. They are not placed on a regular hexagonal grid. When WLANs are installed in multi-tenant office buildings and multiple-unit dwellings, owners simply plug in their AP and start up their LAN. No attention is paid to who else is operating a WLAN nearby. The result is overlapping cell coverage.

Overlapping cells will offer new challenges with the proliferation of WLANs. If there are several PCs attempting to establish contention-free periods (CFPs), they must coordinate their access. Special mechanisms are thus needed to enable multiple PCs to coordinate use of the channel under PCF and provide CFPs for their respective BSS. The current standard does not provide adequate coordination for the operation of the PCF in cases where multiple BSSs are operating on the same channel, in overlapping physical space. New protocols are needed. A complete protocol suite for this purpose has not yet been presented. A BSS operates on a single channel, while several channels are available within each of the bands. There are 3 channels in the 2.4 GHz band and 8 in the 5 GHz band. Once a channel has been assigned, channel time can be shared by using a dynamic bandwidth allocation methods.

The similarity of multi-BSS systems with cellular systems can be exploited in channel assignment only when a single service provider manages all WLANs in a given physical space. Then regular re-use RF planning methods, apply. A re-use factor N=8 can be employed, see Benveniste U.S. Pat. No. 5,740,536. However, repeating assignment of the same channel by a tessellation cannot be used with WLANs whose locations are chosen in an ad hoc manner and may involve even co-located BSSs. Non-regular channel assignment would need to be deployed; it assigns channels optimally, while respecting the interference experienced between BSSs when assigned the same channel—see Benveniste U.S. Pat. No. 5,404,574.

Channel assignment must be adaptive. That is, they should be revised occasionally as the spatial distribution of powered stations changes over time; as different stations are powered on or off at different times, or users are entering and leaving the BSSs. A channel selected upon installation of a station may not be suitable at some future time. While channel selections must be revisited occasionally, dynamic (frame by frame) channel assignment is not feasible as the assigned channel provides control, in addition to data transport.

Self-configuration, which involves stations taking signal-strength measurements to determine during a system operation the interference relationships between BSSs can be employed for adaptive channel assignment—see Benveniste U.S. Pat. No. 6,112,092.

Quality Of Service (OoS)

Quality of service (QoS) is a measure of service quality provided to a customer. The primary measures of QoS are message loss, message delay, and network availability. Voice and video applications have the most rigorous delay and loss requirements. Interactive data applications such as Web browsing have less restrained delay and loss requirements, but they are sensitive to errors. Non-real-time applications such as file transfer, Email, and data backup operate acceptably across a wide range of loss rates and delay. Some applications require a minimum amount of capacity to operate at all, for example, voice and video. Many network providers guarantee specific QoS and capacity levels through the use of Service-Level Agreements (SLAs). An SLA is a contract between an enterprise user and a network provider that specifies the capacity to be provided between points in the network that must be delivered with a specified QoS. If the network provider fails to meet the terms of the SLA, then the user may be entitled to a refund. The SLA is typically offered by network providers for private line, frame relay, ATM, or Internet networks employed by enterprises.

The transmission of time-sensitive and data application traffic over a packet network imposes requirements on the delay or delay jitter and the error rates realized; these parameters are referred to generically as the QoS (Quality of Service) parameters. Prioritized packet scheduling, preferential packet dropping, and bandwidth allocation are among the techniques available at the various nodes of the network, including access points, that enable packets from different applications to be treated differently, helping achieve the different quality of service objectives. Such techniques exist in centralized and distributed variations. The concern herein is with distributed mechanisms for multiple access in a variety of networks, such as cellular packet networks or wireless ad hoc networks. For example, when engaged in dynamic packet assignment in a cellular type of network, the base stations contend among themselves for a channel to be used within their respective cells. Although the channel may be used by the mobile station for an up-link transmission, the serving base station is the one contending. [Patent Application #113006, M. Benveniste, "Asymmetric Measurement-Based Dynamic Packet Assignment system And Method For Wireless Data Services", filed on Mar. 22, 2001, ] In an ad hoc type of network, individual stations contend for the use of a channel.

Management of contention for the shared transmission medium must reflect the goals sought for the performance of the system overall. For instance, one such goal would be the maximization of goodput (the amount of good data transmitted as a fraction of the channel capacity) for the entire system, or of the utilization efficiency of the RF spectrum; another is the minimization of the worst-case delay. As multiple types of traffic with different performance requirements are combined into packet streams that compete for the same transmission medium, a multi-objective optimization is required.

QoS enhancements are necessary in order to facilitate streaming of voice and multimedia traffic together with data. The high error rates experienced in transmitting over a wireless medium can lead to delays and jitter that are unacceptable for such traffic. More delay is added by acknowledgements that become necessary for wireless transmissions, and by the RTS/CTS mechanism if used.

Ideally, one would want a multiple access protocol that is capable of effecting packet transmission scheduling as close to the optimal scheduling as possible but with distributed control. Distributed control implies both limited knowledge of the attributes of the competing packet sources and limited control mechanisms.

To apply any scheduling algorithm in random multiple access, a mechanism must exist that imposes an order in which packets will seize the medium. For distributed control, this ordering must be achieved independently, without any prompting or coordination from a control node. Only if there is a reasonable likelihood that packet transmissions will be ordered according to the scheduling algorithm can one expect that the algorithm's proclaimed objective will be attained.

What is needed is a distributed medium access protocol that schedules transmission of different types of traffic based on their service quality specifications. Depending on these specifications, one such scheduling algorithm would be to assign packets from applications with different service quality specifications different priorities. Higher priority packets would be given preference over lower priority ones in congestion conditions. But in general, it is not desirable to postpone transmission of lower priority packets merely because there are higher priority packets are queued for transmission. The latter would penalize the lower priority traffic classes excessively.

SUMMARY OF THE INVENTION

In accordance with the invention, Quality of Service (QoS) support is provided by means of the Tiered Contention Multiple Access (TCMA) distributed medium access protocol that schedules transmission of different types of traffic based on their service quality specifications.

The TCMA protocol assigns the urgency arbitration time (UAT) of each data packet as a function of the QoS requirement of the data packet. For example, file transfer data with a lower QoS priority will be assigned a longer urgency arbitration time of UAT(A) and voice and video data with a higher QoS priority will be assigned a shorter urgency arbitration time of UAT(B). TCMA minimizes the chance of collisions between wireless stations sharing the medium, while giving preference to those packets in higher urgency classes. In congestion conditions, priority differentiation by UAT offers not only prioritized access to packets ready for transmission, but also freezing of the backoff countdown process of lower priority packets. This is what helps higher priority packets to access the channel more readily in a minimally disruptive way, thus resulting in lower delays.

In one embodiment, a wireless station is supplied with data from a source having a lower delay limit QoS(A), such as file transfer data. Another wireless station is supplied with data from a source having a longer delay limit QoS(B), such as voice and video data. Each wireless station can determine the urgency class of its application packets according to a scheduling algorithm. For example, file transfer data is assigned lower urgency class and voice and video data is assigned higher urgency class. There are several urgency classes which indicate the desired ordering. Packets ready for transmission [packets with expired backoff timer] in a given urgency class are transmitted before transmitting packets of a lower urgency class by relying on class-differentiated urgency arbitration times (UATs), which are the idle time intervals required before the random backoff counter is decreased. The TCMA protocol assigns the urgency arbitration time (UAT) of each packet as a function of the QoS priority of the data packet. For example, file transfer data with a lower QoS priority will be assigned a longer urgency arbitration time of UAT(A) and voice and video data with a higher QoS priority will be assigned a shorter urgency arbitration time of UAT(B).

In general, there are two channel idle times involved in backoff countdown of CSMA/CA. Depending on the backoff countdown procedure employed, prioritization can be achieved through variation by urgency class of either of the two idle-time requirements or both of them together. For backoff countdown to start, the channel must be idle following a busy time period for a time interval referred to as the backoff-counter preparation time (BCPT). The backoff counter is then decreased if the channel remains idle for a specified time interval, which is referred to as the backoff-counter update time (BCUT). In the IEEE 802.11 Standard, BCPT is equal to DIFS, and BCUT is equal to the slot time.

Consider the case where the BCPT is used as the UAT. Each urgency class has a corresponding urgency arbitration time (UAT) during which the channel must remain idle before starting the backoff interval for packets assigned to that urgency class. For example, the urgency arbitration time UAT(A) for a less urgent class "A" and the urgency arbitration time UAT(B) for a more urgent class B". The urgency arbitration time UAT(B) for the more urgent class "B" is shorter. The urgency arbitration time UAT(A) for a less urgent class "A" is longer Suppose the channel is idle. At the end of the shorter urgency arbitration time UAT(B) for the more urgent class "B", the random backoff begins to count down for all of the packets assigned to the more urgent class "B". When it reaches zero, and the station's sensing mechanism indicates the medium is still not busy, then the packet is transmitted. The same operation of counting down respective random backoff intervals is repeated for other packets assigned to the more urgent class "B", until they are all transmitted or until they time out.

The urgency arbitration time UAT(A) for the less urgent class "A" is longer. Assuming that the channel remains idle at the end of the longer urgency arbitration time UAT(A) for the less urgent class "A", the random backoff delay begins to count down for all of the packets assigned to the less urgent class "A". Countdown is interrupted when the channel gets busy, and the station must wait for an idle period equal to its urgency arbitration time before it resumes countdown again. If the backoff delay of a node assigned the more urgent class "B" is 1 following a busy period, the countdown of the less urgent class "A" will not get started.

Further in accordance with the invention, the value of the random backoff interval is selected randomly from a statistical distribution, whose mean and variance are set adaptively in response to the observed traffic intensity. The parameters of this distribution may be used to further differentiate between urgency classes. When the random backoff is drawn from a uniform statistical distribution, the range of the backoff is calculated based on a contention window range CW(A) which has an initial lower value L(A) and an initial upper value U(A), which are functions of the urgency class.

Further in accordance with the invention, the random backoff interval is calculated based on a contention window range CW(A) which has an initial lower value L(A) and an initial upper value U(A), which are functions of the urgency class. The value of the random backoff interval is selected randomly from a statistical distribution, whose mean and variance are set adaptively in response to the observed traffic intensity.

Still further in accordance with the invention, several input parameters provide differentiation between different urgency class transmissions. Differentiation between different urgency class transmissions is achieved through the use of class-specific urgency arbitration times (UATs). The arbitration time is the time interval that the channel must be sensed idle by a node before decreasing its backoff counter. Differentiation between different urgency class transmissions is achieved through the use of class-specific parameters of the probability distribution used to generate random backoff times and class-specific backoff retry adjustment functions. The backoff time is drawn from a uniform random distribution. The backoff retry parameters determine how the backoff distribution parameters are adjusted on successive retries following transmission failure. Differentiation between different urgency class transmissions is achieved through the use of class-specific packet age limits. The age limits lead to the cancellation of a transmission if the time since arrival exceeds a threshold value. Differentiation between different urgency class transmissions is achieved through the use of a persistence factor, $pf_i$, that is different for each class i, which is used to multiply the backoff window from which backoff counters will be drawn randomly upon transmission retrial.

Still further in accordance with the invention, a new backoff range is determined by functions that depend on the packet's class, the traffic congestion estimates, and on the time spent by the packet waiting for transmission. Congestion estimates are derived from data that include: feedback on the success or failure of a transmission attempt, the number of re-transmissions attempted by a node and by each of its neighbor nodes and from the age of such retrials. A separate number of transmission attempts is remembered or broadcast for each urgency class; and congestion is thus estimated for each urgency class. This is made possible through the introduction of new fields in all reservation messages, including request to send (RTS) and clear to send (CTS), as well as headers of transmitted packets. The fields indicate the number of transmission attempts.

Still further in accordance with the invention, Tiered Contention Multiple Access (TCMA) enables the co-existence of centralized and distributed access protocols on the same channel through contention-based access. To make this possible, the proper choice of an arbitration time for the centralized protocol is made so that the following requirements are met: (i) the centralized protocol enjoys top priority access; (ii)

once the centralized protocol seizes the channel, it maintains control until the contention-free period is ended; and (iii) then wireless stations having at least one traffic class with access priority above that of legacy stations can employ the TCMA protocol to transmit their respective urgency classes of data.

The resulting invention provides a distributed medium access protocol that schedules transmission of different types of traffic based on their service quality specifications. Network providers can offer services defined in terms of any or all of the parameters proposed for traffic class differentiation. The parameter values associated with each class can be set in real time through the AP for flow control in order to meet Service-Level Agreements.

An Enhanced DCF Parameter Set is contained in a control packet sent by the AP to the associated stations, which contains class differentiated parameter values necessary to support the TCMA. These parameters can be changed based on different algorithms to support call admission and flow control functions and to meet the requirements of service level agreements.

DESCRIPTION OF THE FIGURES

FIG. 1A is a network diagram of a prior art single-cell wireless LAN, operating with the CSMA/CA protocol.

FIG. 1B is a timing diagram of the prior art CSMA/CA protocol operating in FIG. 1A.

FIG. 1C is a more detailed timing diagram of the prior art CSMA/CA protocol of FIG. 1B.

FIG. 1D Illustrates the prior art technique for computing the random backoff interval in the CSMA/CA protocol of FIG. 1C.

FIG. 2C is a more detailed timing diagram of the TCMA protocol of FIG. 2B, in accordance with the invention.

FIG. 2D illustrates the technique for computing urgency arbitration time UAT(A) and the contention window range CW(A) as a function of a lower quality of service requirement QOS(A) in the TCMA protocol of FIG. 2C, in accordance with the invention.

FIG. 2E illustrates the technique for computing urgency arbitration time UAT(B) and the contention window range CW(B) as a function of a higher quality of service requirement QOS(B) in the TCMA protocol of FIG. 2C, in accordance with the invention.

FIG. 2F is a network diagram of a single-cell wireless LAN 200' and three stations transmitting data with two different QoS priorities, operating with the Tiered Contention Multiple access TCMA protocol, in accordance with the invention.

FIG. 2G is a timing diagram of the TCMA protocol, operating in FIG. 2F, in accordance with the invention.

FIG. 6 is a message format diagram of a message, such as a request to send (RTS) and clear to send (CTS), or a header of transmitted packet, indicating the number of transmission attempts. Congestion is estimated for each urgency class through the introduction of this message format.

FIG. 7A is a network diagram of a multiple-cell wireless LAN with two access points operating with the Tiered Contention Multiple access TCMA protocol, in accordance with the invention.

FIG. 7B is a timing diagram of the TCMA protocol, in accordance with the invention, operating in FIG. 7A.

FIGS. 13C and 13D illustrate delay and jitter for a single call.

FIGS. 13A and 13C illustrate the operation without dropping delayed frames whereas FIGS. 13B and 13D illustrate the operation for dropping voice frames with MSDU lifetime >20 ms.

DISCUSSION OF THE PREFERRED EMBODIMENT

Figure 1:
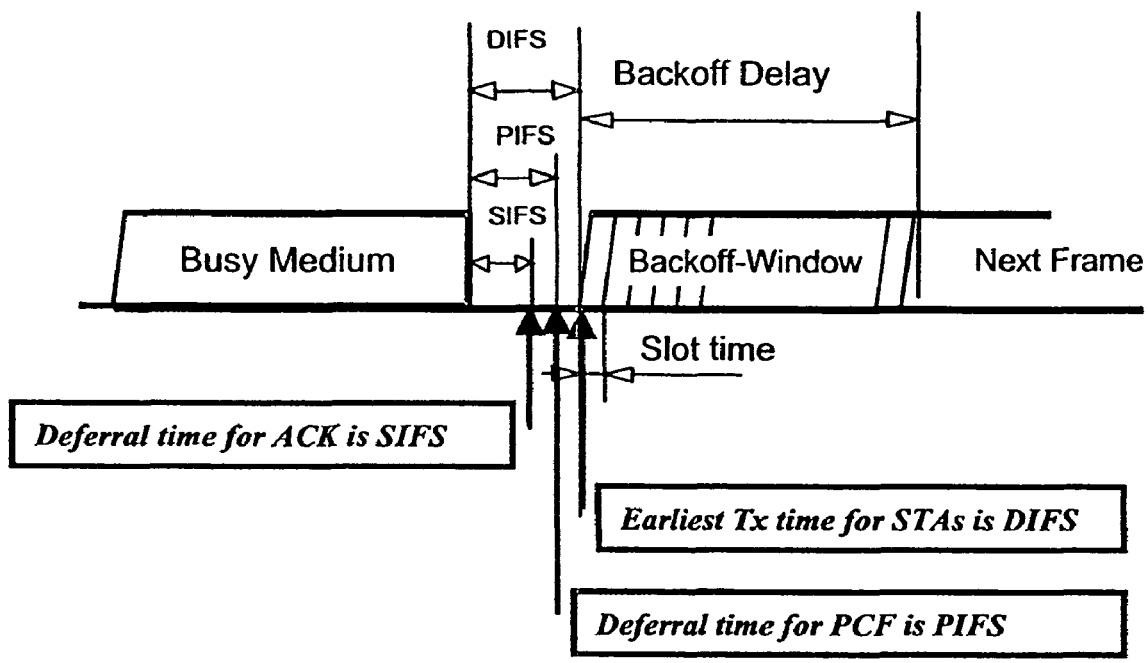
FIG. 1 illustrates the backoff procedure.
Figure 2B:
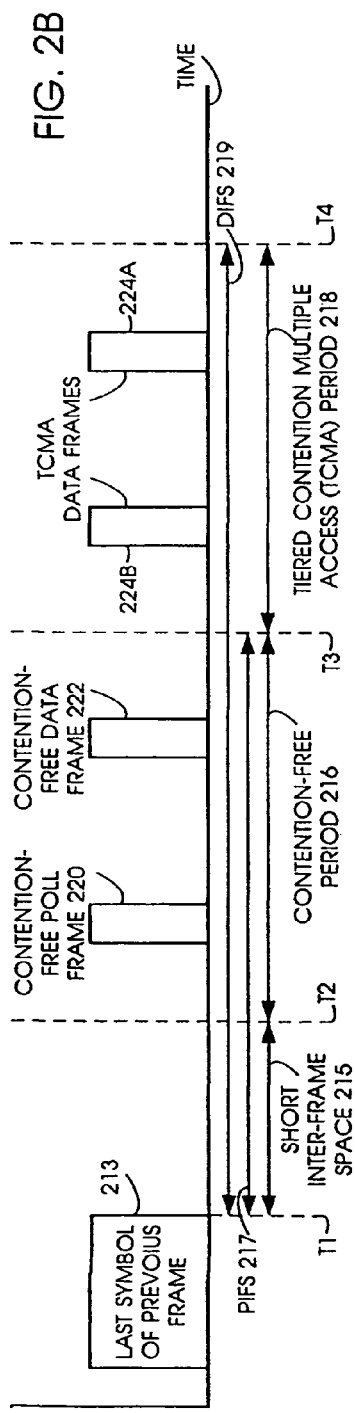
FIG. 2B is a timing diagram of the TCMA protocol operating in FIG. 2A, in accordance with the invention.
Figure 2A:
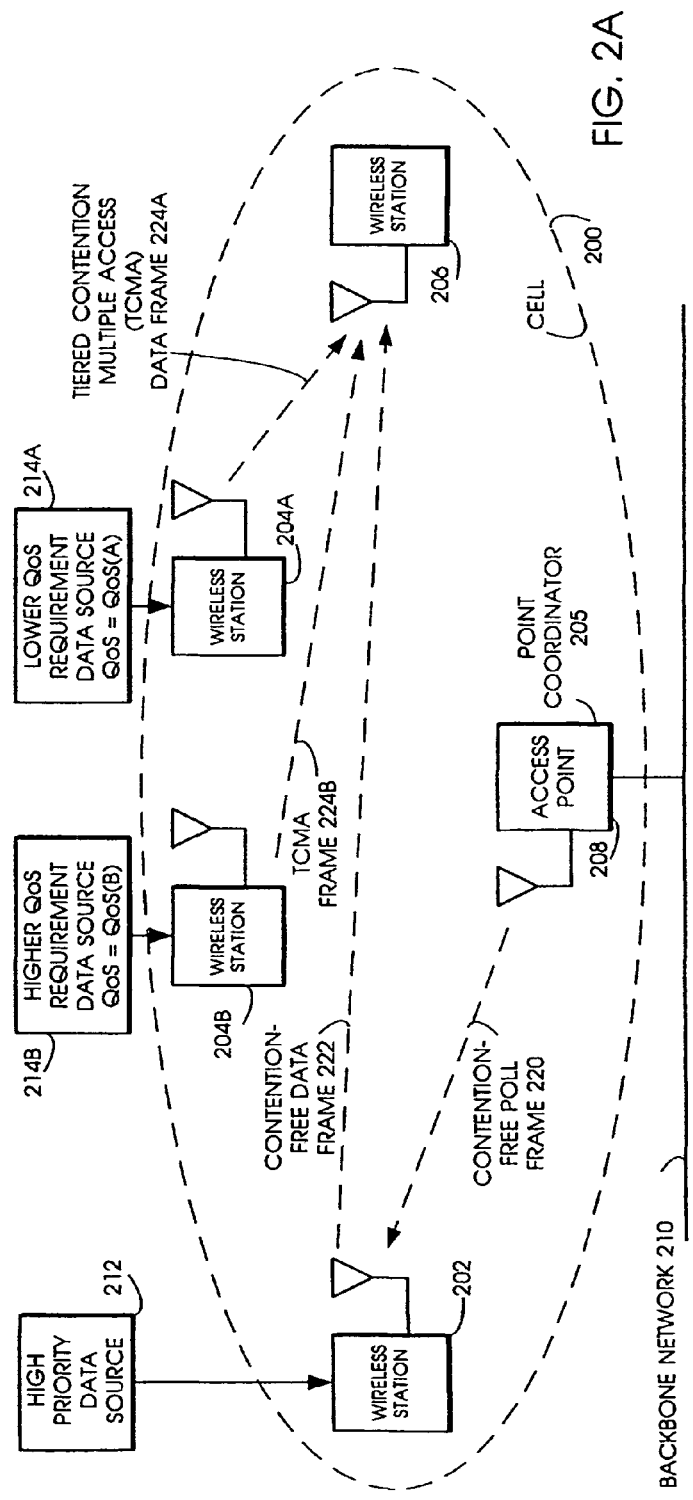
FIG. 2A is a network diagram of a single-cell wireless LAN 200 and two stations transmitting data with different QoS priorities, operating with the Tiered Contention Multiple access TCMA protocol, in accordance with the invention.

FIG. 2A is a network diagram of a single-cell wireless LAN 200, operating with the Tiered Contention Multiple Access (TCMA) protocol, in accordance with the invention. The single-cell wireless LAN 200 provides connectivity within radio range between wireless stations 202, 204A, 204B, 206, and 208. Access point 208 is a wireless station that allows connections via the backbone network 210 to wired network-based resources, such as servers. Station 204A is supplied with data from a file transfer data source 214A, which has a lower QoS priority QoS(A). Non-real-time applications such as file transfer, Email, and data backup can tolerate greater delay. Station 204B is supplied with voice and video data from data source 214B, which has a higher QoS priority QoS(B). Voice and video applications have the most rigorous delay and loss requirements.

Before transmitting a frame, the medium access control (MAC) layer must first gain access to the network. FIG. 2B shows three interframe space (IFS) intervals that defer a station's access to the medium and provides various levels of priority. Each interval defines the duration between the end of the last symbol of the previous frame 213 at time T1 to the beginning of the first symbol of the next frame at T2. The Short Interframe Space (SIFS) 215 provides the highest priority level by allowing some frames to access the medium before others.

The Priority Interframe Space (PIFS) 217 of FIG. 2B is used for high priority access to the medium during the contention-free period 216 starting at T2 and ending at T3. The point coordinator 205 in the access point 208 connected to backbone network 210 in FIG. 2A controls the priority-based Point Coordination Function (PCF) to dictate which stations in cell 200 can gain access to the medium. During the contention-free period 216, station 202 in FIG. 2A, for example, is directed by the access point 208 to transmit its high priority data frame 222. The point coordinator 205 in the access point 208 sends a contention-free poll frame 220 to station 202, granting station 202 permission to transmit a single frame to any destination. Station 202 wants to transmit its high priority data frame 222 to the receiving station 206. Station 202 can transmit its frame 222 during period 216 if it senses that the medium is idle. All other stations, such as stations 204A, 204B, and 206, in the cell 200 can only transmit during contention-free period 216 if the point coordinator 205 grants them access to the medium. In this example, stations 204A and 204B have data sources 214A and 214B which are lower priority than the high priority data frame 222, and thus they must wait until the end of the contention-free period 216 at T3. This is signaled by the contention-free end frame 226 sent by the point coordinator 205, in FIG. 2C. The contention-free end frame 226 is sent to identify the end of the contention-free period 216, which occurs when time expires or when the point coordinator 205 has no further frames to transmit and no stations to poll.

The distributed coordination function (DCF) Interframe Space (DIFS) 219 of FIG. 2B is used by stations 204A and 204B, for example, for transmitting data frames 224A and 224B, respectively, during the tiered contention multiple access (TCMA) period 218. The DIFS spacing delays the transmission of frames 224A and 224B to occur between T3 and T4, later than the priority-based transmission of frame 222 sent by station 202.

An important feature of the invention is providing QoS support by means of the TCMA distributed medium access protocol that schedules transmission of different types of traffic based on their service quality specifications. Station 204A is supplied with data from the file transfer data source 214A, which has a lower QoS priority QoS(A). Station 204B is supplied with voice and video data from data source 214B, which has a higher QoS priority QoS(B). Each wireless station 204A and 204B can determine the urgency class of its pending packets according to a scheduling algorithm. For example, file transfer data is assigned lower urgency class "A" and voice and video data is assigned higher urgency class "B". There are several urgency classes which indicate the desired ordering. Pending packets in a given urgency class are transmitted before transmitting packets of a lower urgency class by relying on class-differentiated urgency arbitration times (UATs), which are the idle time intervals required before the random backoff counter is decreased.

The tiered contention multiple access (TCMA) protocol which operates during period 218 minimizes the chance of collisions between stations sharing the medium, while giving preference to those packets in higher urgency classes. Each urgency class has a corresponding urgency arbitration time (UAT) which must expire before starting the random backoff interval for packets assigned to that urgency class. For example, FIG. 2C shows that when the contention-free end frame 226 is received from the point coordinator 205 at time T3, the urgency arbitration time UAT(A) for the less urgent class "A" and the urgency arbitration time UAT(B) for the more urgent class "B" both begin to count down for each respective urgency class. The urgency arbitration time UAT (B) for the more urgent class "B" has a shorter interval that ends at time T3'. The urgency arbitration time UAT(A) for a less urgent class "A" has a longer interval that ends at time T3". At the end of the shorter urgency arbitration time UAT (B) for the more urgent class "B", the random backoff interval begins to count down for all of the packets assigned to the more urgent class "B". The random backoff interval 228B for the data packet 224B begins to count down from time T3' and when it reaches zero, if the station's sensing mechanism indicates the medium is not busy, then the packet 224B is transmitted. The same operation of counting down respective random backoff intervals is repeated for other packets assigned to the more urgent class "B", until they are all transmitted or until they time out at time T3".

The urgency arbitration time UAT(A) for the less urgent class "A" has a longer interval that ends at time T3". At the end of the longer urgency arbitration time UAT(A) for the less urgent class "A", the random backoff interval begins to count down for all of the packets assigned to the less urgent class "A". The random backoff interval 228A for the data packet 224A begins to count down from time T3"; and when it reaches zero, if the station's sensing mechanism indicates the medium is not busy, then the packet 224A is transmitted. The same operation of counting down respective random backoff intervals is repeated for other packets assigned to the less urgent class "A", until they are all transmitted or until they time out at time T4.

As shown in FIG. 2D, the TCMA protocol at 230A assigns the urgency arbitration time (UAT) of each data packet as a function of the QoS priority of the data packet. For example, file transfer data with a lower QoS priority will be assigned a longer urgency arbitration time of UAT(A). In FIG. 2E, voice and video data with a higher QoS priority will be assigned a shorter urgency arbitration time of UAT(B).

In addition, as shown in FIG. 2D, the random backoff interval is calculated based on a contention window range CW(A) which has an initial lower value L(A) and an initial upper value U(A), which are functions of the urgency class. The value of the random backoff interval is selected randomly from a statistical distribution, whose mean and variance are set adaptively in response to the observed traffic intensity. In FIG. 2E, the random backoff interval is calculated based on a contention window range CW(B) which has an initial lower value L(B) and an initial upper value U(B), which are functions of the urgency class. The value of the random backoff interval is selected randomly from a statistical distribution, whose mean and variance are set adaptively in response to the observed traffic intensity.

Other parameters can be made a function of the QoS priority to enable differential treatment of packets with different urgency classes, including the choice of UAT, the backoff timer distribution parameters, and the retry update parameters. Table 1 lists the differentiating parameters for the different urgency classes.

TABLE 1

Urgency class differentiation

| Urgency Class y | UAT[y] | Initial Backoff Range (rLower[y], rUpper[y]) | Persistence Factor | Age Limit aAgeLimit[y] |
|---|---|---|---|---|
| 1 | PIFS | $(L_1, U_1)$ | $pf_1$ | $D_1$ |
| 2 | PIFS | $(L_2, U_2)$ | $pf_2$ | $D_2$ |
| 3 | PIFS | $(L_3, U_3)$ | $pf_3$ | $D_3$ |
| 4 | DIFS | $(L_4, U_4)$ | $pf_4$ | $D_4$ |

FIG. 2F is a network diagram of a single-cell wireless LAN 200' and three stations transmitting data with two different QoS priorities, operating with the Tiered Contention Multiple access TCMA protocol, in accordance with the invention. The single-cell wireless LAN 200' provides connectivity within radio range between wireless stations 202, 204A, 204B, 204C, 206, and 208. Stations 204A and 204B are the same as those shown in FIG. 2A. Station 204C is supplied with voice and video data from data source 214C, which has the higher QoS priority QoS(B), the same as for station 204B. Thus, the TCMA frame 224C to be transmitted from station 204C must contend with the TCMA frame 224B from station 204B for transmission following urgency arbitration time UAT(B) at T3'. FIG. 2G is a timing diagram of the TCMA protocol, operating in FIG. 2F, in accordance with the invention. The random backoff interval 228B drawn by the data packet 224B at station 204B is shorter than the random backoff interval 228C drawn by the data packet 224C at station 204C. Thus, the data packet 224B is transmitted before the data packet 224C, following the urgency arbitration time UAT(B) at T3'. The urgency arbitration time UAT(A) for the less urgent TCMA frame 224A has a longer interval that ends at time T3". At the end of the longer urgency arbitration time UAT(A), random backoff interval 228A for the data packet 224A begins to count down from time T3"; and when it reaches zero, if the station 214A sensing mechanism indicates medium is not busy, then the packet 224A is transmitted.

Figure 2I:
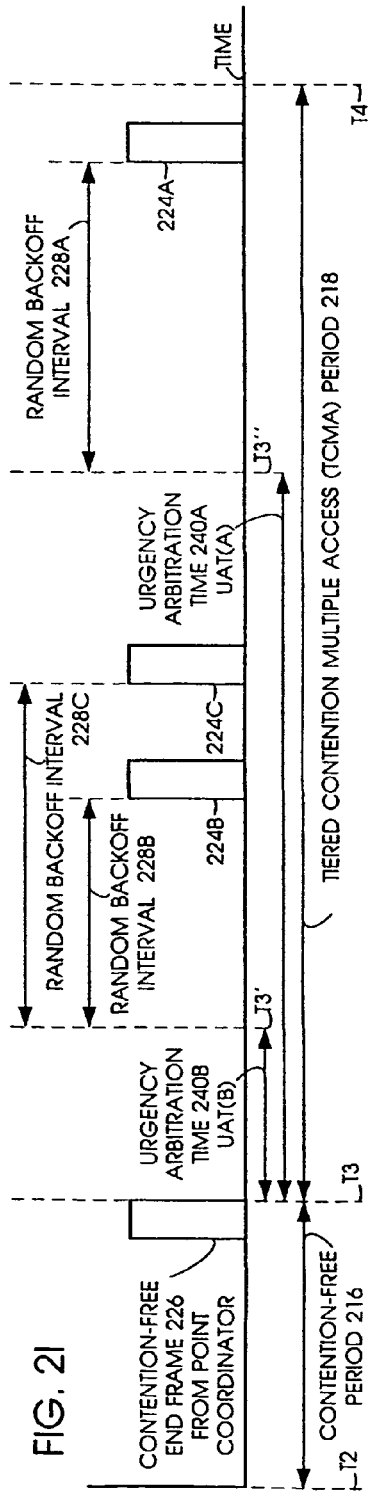
FIG. 2I is a timing diagram of the TCMA protocol, operating in FIG. 2H, in accordance with the invention.
Figure 2H:
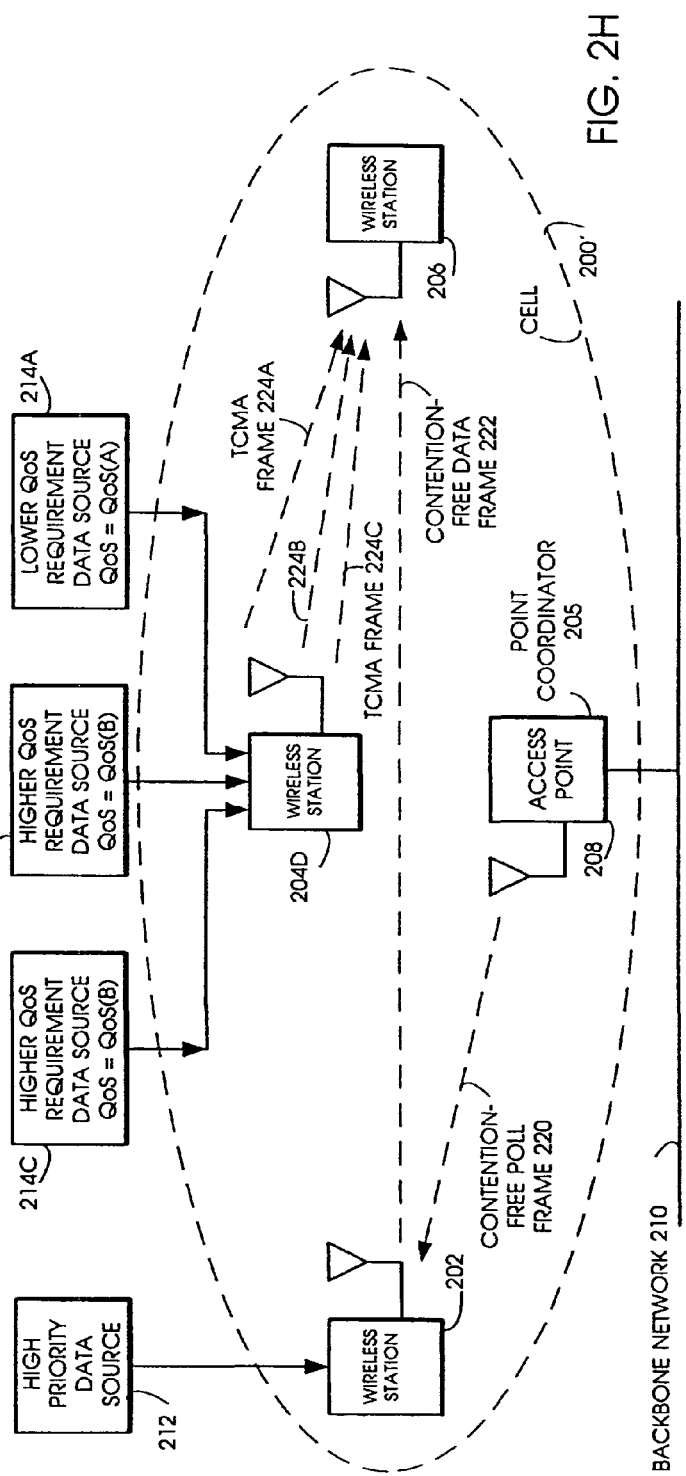
FIG. 2H is a network diagram of a single-cell wireless LAN 200" and one station transmitting data with two different QoS priorities, operating with the Tiered Contention Multiple access TCMA protocol, in accordance with the invention.

FIG. 2H is a network diagram of a single-cell wireless LAN 200" and one station transmitting data with two different QoS priorities, operating with the Tiered Contention Multiple access TCMA protocol, in accordance with the invention. The single-cell wireless LAN 200" provides connectivity within radio range between wireless stations 202, 204D, 206, and 208. Station 204D has all three data sources 214A, 214B, and 214C shown in FIG. 2F. Station 204D is supplied with voice and video data from both data sources 214B and 214C, which have the higher QoS priority QoS(B). Station 204D is supplied with file transfer data source 214A, which has a lower QoS priority QoS(A). Thus, the TCMA frame 224C to be transmitted from station 204D must contend with the TCMA frame 224B from station 204D for transmission following urgency arbitration time UAT(B) at T3'. FIG. 2I is a timing diagram of the TCMA protocol, operating in FIG. 2H, in accordance with the invention. The random backoff interval 228B drawn by the data packet 224B at station 204D is shorter than the random backoff interval 228C drawn by the data packet 224C at station 204D. Thus, the data packet 224B is transmitted before the data packet 224C, following the urgency arbitration time UAT(B) at T3'. The urgency arbitration time UAT(A) for the less urgent TCMA frame 224A at station 204D has a longer interval that ends at time T3". At the end of the longer urgency arbitration time UAT(A), random backoff interval 228A for the data packet 224A begins to count down from time T3"; and when it reaches zero, if the station 214D sensing mechanism indicates medium is not busy, then the packet 224A is transmitted.

Figure 3:
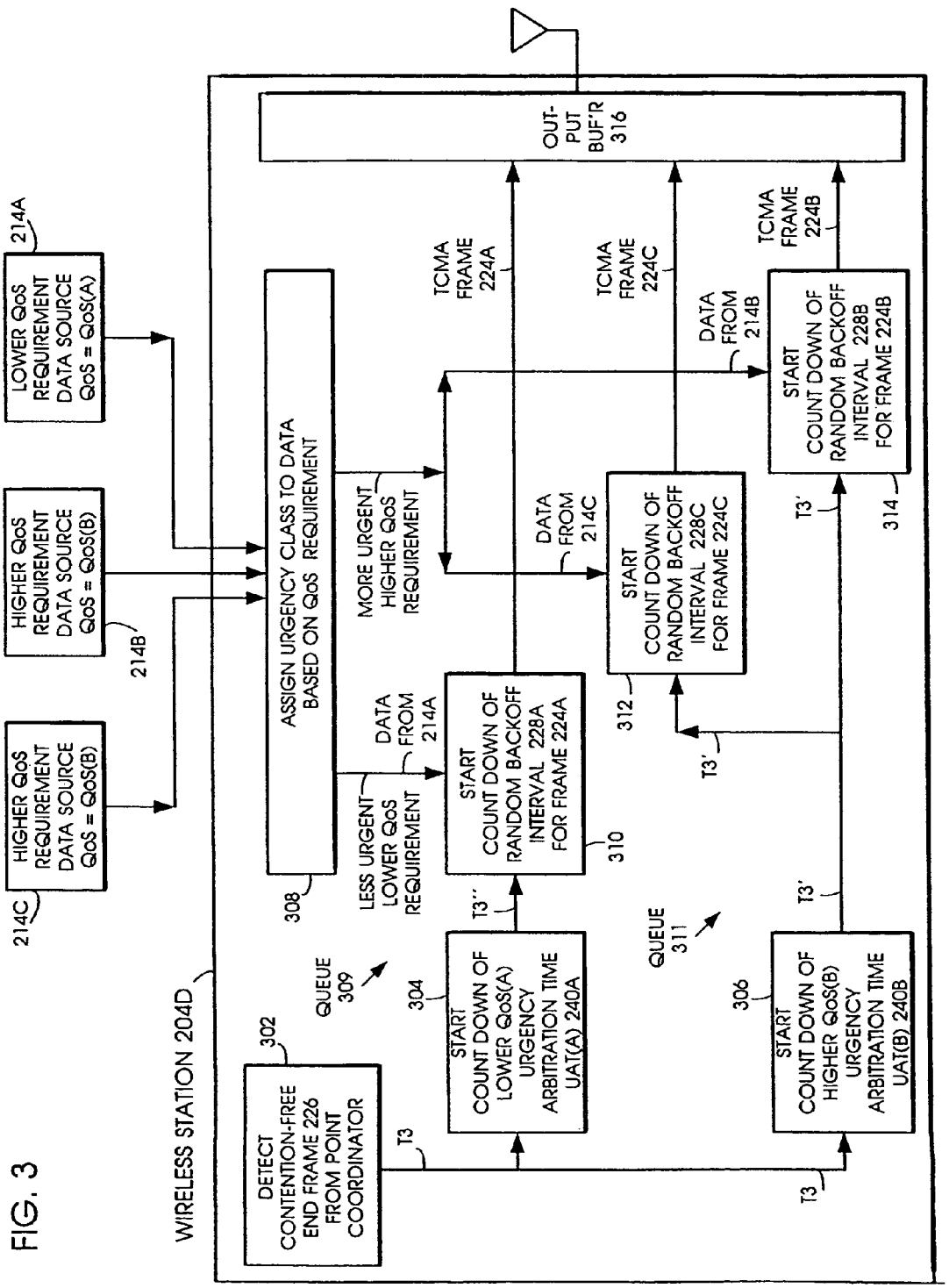
FIG. 3 is a functional block diagram of the TCMA urgency class processing based on QoS priorities of data for two urgency classes in the wireless station 204D.

FIG. 3 is a functional block diagram of the TCMA urgency class processing based on QoS priorities for two urgency classes in the wireless station 204D of FIG. 2H. Station 204D is supplied with file transfer data packet 224A from data source 214A, which has a lower QoS priority QoS(A). Station 204D is supplied with voice and video data packet 224B from data source 214B, which has a higher QoS priority QoS(B). Station 204D is also supplied with voice and video data packet 224C from data source 214C, which has the higher QoS priority QoS(B). Logic 308 assigns an urgency class to each data packet based on its QoS priority. For example, file transfer data packet 224A is assigned lower urgency class "A" and voice and video data packets 224B and 224C are assigned higher urgency class "B". Logic 308 steers data packet 224A to a first queue 309 for less urgent data having a lower QoS priority, such as file transfer data. Logic 308 can distinguish file transfer data by its file transfer protocol (FTP) format. Block 308 steers data packets 224B and 224C to a second queue 311 for more urgent data having a higher QoS priority, such as voice and video data. Logic 308 can distinguish voice and video data by its streaming media format, for example.

After logic 308 has assigned a data packet to a queue, a random backoff interval is selected and paired with the packet. The length of time represented by the random backoff interval governs the position of the data packet in the queue. The lower QoS data packet 224A from data source 214A draws the random backoff interval 228A in FIG. 2I, and is assigned a corresponding position in the first queue 309. The first queue 309 for less urgent data in FIG. 3 includes timer 304 which times the lower urgency arbitration time UAT(A) and timer 310 which times the random backoff interval for each data packet in the queue. When detector 302 detects the contention-free end frame 226 from the point coordinator 205 at time T3, this starts the count down of timer 304 of the lower urgency arbitration time UAT(A). The higher QoS data packet 224B from data source 214B draws the random backoff interval 228B in FIG. 2I, and is assigned a corresponding position in the second queue 311. The higher QoS data packet 224C from data source 214C draws the random backoff interval 228C in FIG. 2I, and is assigned a corresponding position in the second queue 311. The second queue 311 for more urgent data in FIG. 3 includes timer 306 which times the higher urgency arbitration time UAT(B) and timers 312 and 314 which time the random backoff interval for each data packet in the queue. When detector 302 detects the contention-free end frame 226 from the point coordinator 205 at time T3, this also starts the count down of timer 306 of the higher urgency arbitration time UAT(B).

When the higher urgency arbitration time UAT(B) times out first at time T3', this starts the count down of timers 312 and 314 of the random backoff intervals 228B and 228C. The timer 314 for data packet 224B times out first and data packet 224B is passed to the transmission output buffer 316 before data packet 224C, as shown in FIG. 2I. When timer 304 times out at later time T3" for the lower urgency arbitration time UAT(A), this starts the count down of timer 310 of the random backoff interval 228A. When timer 310 times out, lower urgency data packet 224A is passed to the transmission output buffer 316, as shown in FIG. 2I.

Figure 4:
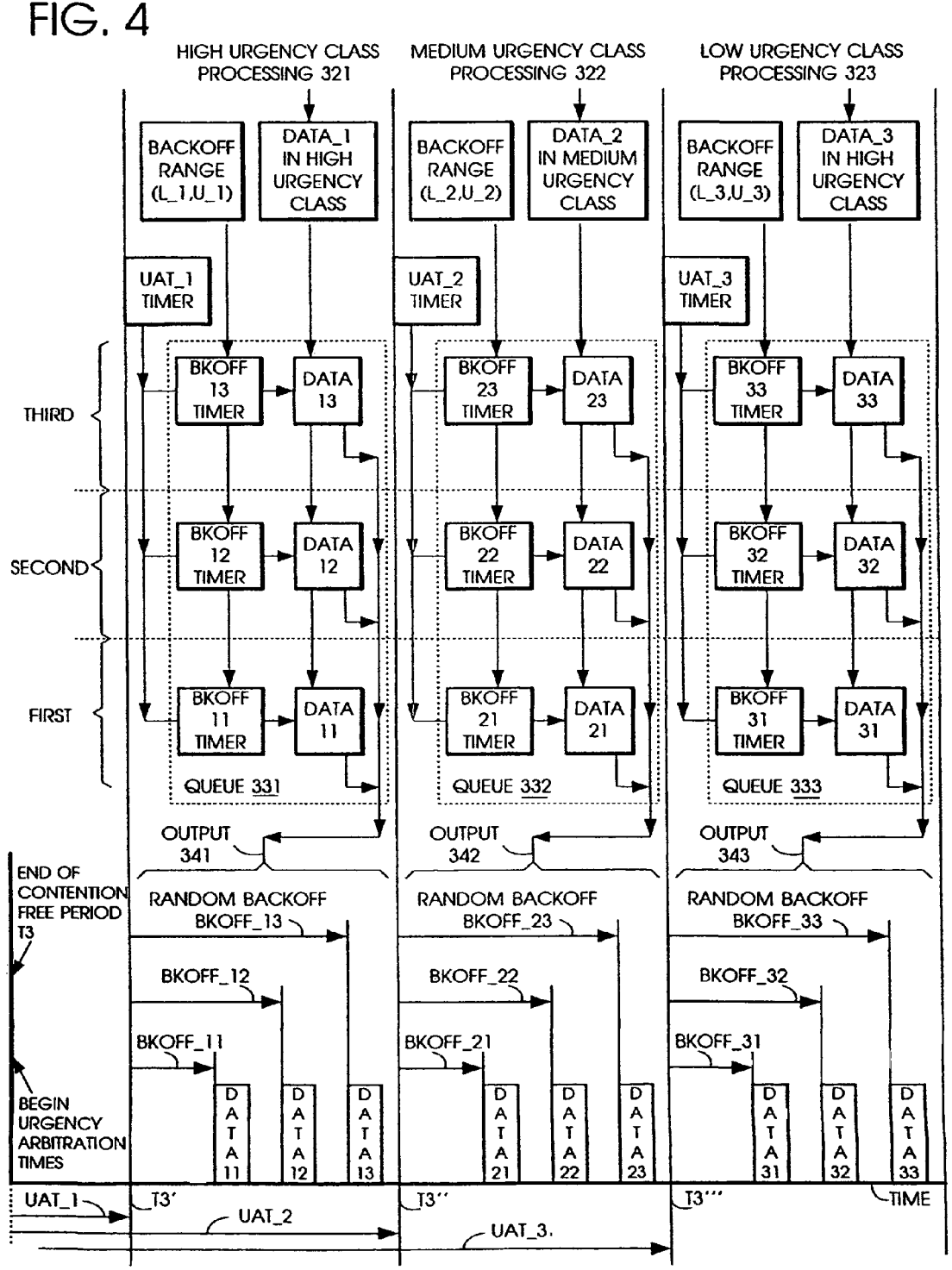
FIG. 4 is a more detailed functional block diagram of the TCMA urgency class processing based and the resulting ordering of the transmission of data packets for three urgency classes. The urgency class processing can be in a single wireless station with three different urgency classes or it can be distributed in multiple wireless stations, each with from one to three urgency classes.

FIG. 4 is a more detailed functional block diagram of the TCMA urgency class processing and the resulting ordering of the transmission of data packets for three urgency classes. The urgency class processing can be performed in a single wireless station with three different urgency classes or it can be distributed in multiple wireless stations, each with from one to three urgency classes. The notation used in FIG. 4 is a matrix-type notation, to facilitate explaining the operation of the three queues 331, 332, and 333 for the three respective urgency classes "1", "2", and "3". The processing of three urgency classes is shown in FIG. 4. High urgency class processing 321 for class "1" operates on data packets DATA_1 which have been classified as high urgency data, such as voice and video data. Three data packets are shown in this class: DATA_11, DATA_12, and DATA_13, where the left index represents the urgency class "1" and the right index represents the relative delay of the backoff interval, with DATA_13 being delayed longer than DATA_11. As each of these data packets is assigned to the queue 331, a random backoff interval is selected and paired with the packet. The random backoff interval is a random number selected from the backoff range, which has a lower bound of L_1 and an upper bound of U_1, which are a function of the urgency class. The length of time represented by the random backoff interval governs the position of the data packet in the queue, with DATA_13 being delayed the longest interval of BKOFF_13, DATA_12, which is delayed the second longest interval of BKOFF_12, and DATA_11 which is delayed the shortest interval of BKOFF_11. The high urgency arbitration timer UAT_1 begins its count down at time T3 at the end of the contention-free period. The high urgency arbitration timer UAT_1 times out first at time T3', and this starts the count down of backoff timers BKOFF_13, BKOFF_12, and BKOFF_11. As each respective backoff timer times out, the corresponding high urgency data packet DATA_11, DATA_12, and DATA_13 is output at 341 and transmitted, as shown in the timing diagram at the bottom of FIG. 4.

Medium urgency class processing 322 for class "2" operates on data packets DATA_2 which have been classified as medium urgency data, such as interactive data. Three data packets are shown in this class: DATA_21, DATA_22, and DATA_23, where the left index represents the urgency class "2" and the right index represents the relative delay of the backoff interval, with DATA_23 being delayed longer than DATA_21. As each of these data packets is assigned to the queue 332, a random backoff interval is selected and paired with the packet. The random backoff interval is a random number selected from the backoff range, which has a lower bound of L_2 and an upper bound of U_2, which are a function of the urgency class "2". The length of time represented by the random backoff interval governs the position of the data packet in the queue, with DATA_23 being delayed the longest interval of BKOFF_23, DATA_22, which is delayed the second longest interval of BKOFF_22, and DATA_21 which is delayed the shortest interval of BKOFF_21. The medium urgency arbitration timer UAT_2 begins its count down at time T3 at the end of the contention-free period. The medium urgency arbitration timer UAT_2 times out second at time T3", and this starts the count down of backoff timers BKOFF_23, BKOFF_22, and BKOFF_21. As each respective backoff timer times out, the corresponding medium urgency data packet DATA_21, DATA_22, and DATA_23 is output at 342 and transmitted, as shown in the timing diagram at the bottom of FIG. 4.

Low urgency class processing 323 for class "3" operates on data packets DATA_3 which have been classified as low urgency data, such as file transfer data. Three data packets are shown in this class: DATA_31, DATA_32, and DATA_33, where the left index represents the urgency class "3" and the right index represents the relative delay of the backoff interval, with DATA_33 being delayed longer than DATA_31. As each of these data packets is assigned to the queue 333, a random backoff interval is selected and paired with the packet. The random backoff interval is a random number selected from the backoff range, which has a lower bound of L_3 and an upper bound of U_3, which are a function of the urgency class "3". The length of time represented by the random backoff interval governs the position of the data packet in the queue, with DATA_33 being delayed the longest interval of BKOFF_33, DATA_32, which is delayed the second longest interval of BKOFF_32, and DATA_31 which is delayed the shortest interval of BKOFF_31. The low urgency arbitration timer UAT_3 begins its count down at time T3 at the end of the contention-free period. The low urgency arbitration timer UAT_3 times out third at time T3''', and this starts the count down of backoff timers BKOFF_33, BKOFF_32, and BKOFF_31. As each respective backoff timer times out, the corresponding low urgency data packet DATA_31, DATA_32, and DATA_33 is output at 343 and transmitted, as shown in the timing diagram at the bottom of FIG. 4.

Figure 5A:
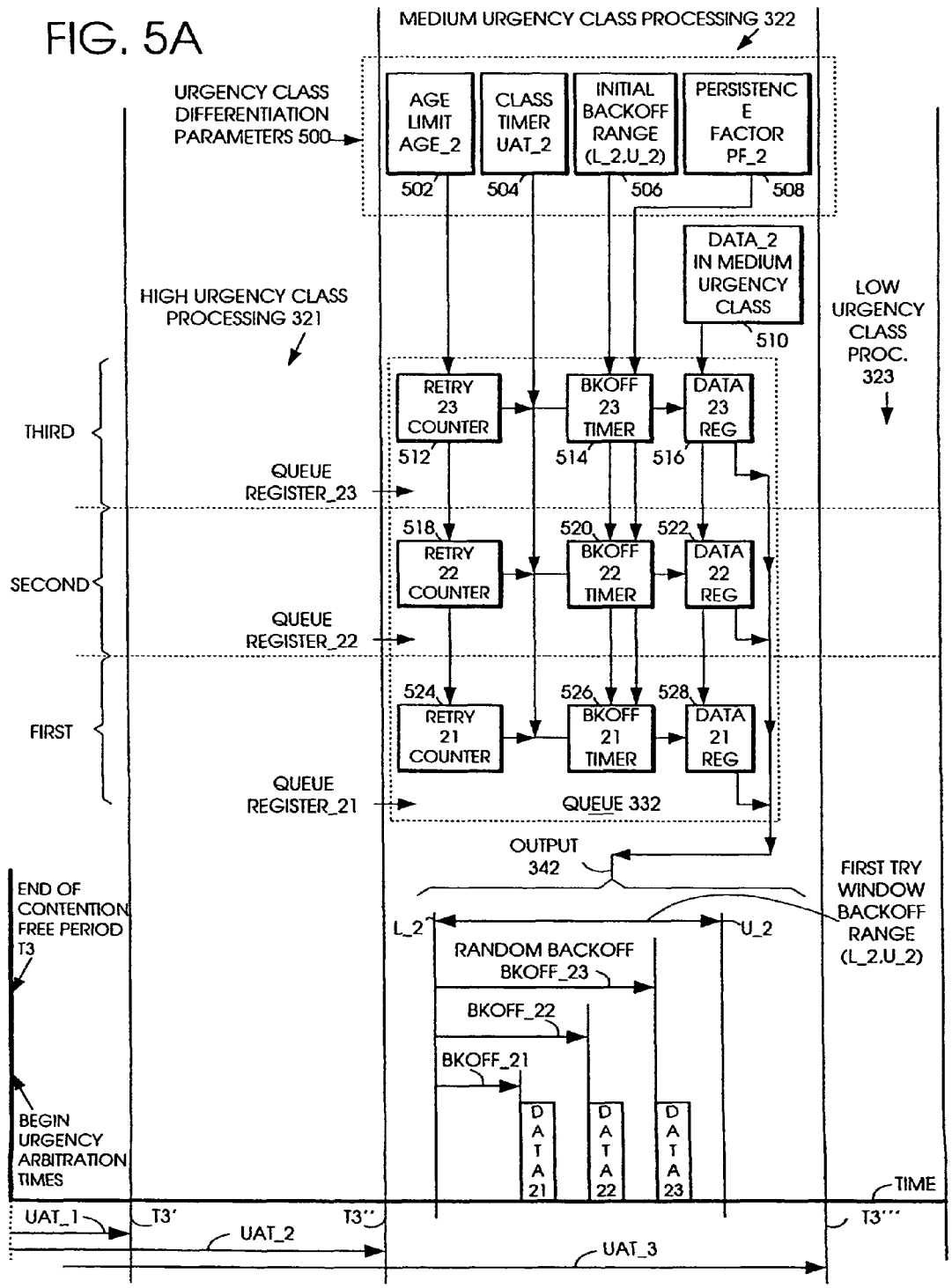
FIG. 5A is a more detailed functional block diagram of the TCMA urgency class processing of FIG. 4, showing several input parameters that provide differentiation between different urgency class transmissions for the medium urgency class for a first try backoff range L_2,U_2.

FIG. 5A is a more detailed functional block diagram of the TCMA urgency class processing of FIG. 4, showing several input parameters that provide differentiation between different urgency class transmissions. FIG. 5A shows the resulting ordering of the transmission of data packets for the medium urgency class for a first try backoff range L_2,U_2. Differentiation between different urgency class transmissions is achieved through the use of the class timer 504 providing class-specific urgency arbitration times (UATs). The arbitration time is the time interval that the channel must be sensed idle by a node before decreasing its backoff counter. Initial backoff range buffer 506 provides class-specific parameters of the probability distribution used to generate random backoff times and class-specific backoff retry adjustment functions. The backoff time is drawn from a uniform random distribution. The backoff retry parameters determine how the backoff distribution parameters are adjusted on successive retries following transmission failure. Age limit buffer 502 provides class-specific packet age limits. The age limits lead to the cancellation of a transmission if the time since arrival at the MAC layer exceeds a threshold value. The persistence factor buffer 508 provides a persistence factor, $pf_i$, that is different for each class. The persistence factor, $pf_i$, that is different for each class i, will be used to multiply the backoff window from which backoff counters will be drawn randomly upon transmission retrial. FIG. 5A also shows the organization of the queue register_21, the queue register_22, and the queue register_23 in their respectively earlier to later time order in the urgency class processing 322.

Figure 5B:
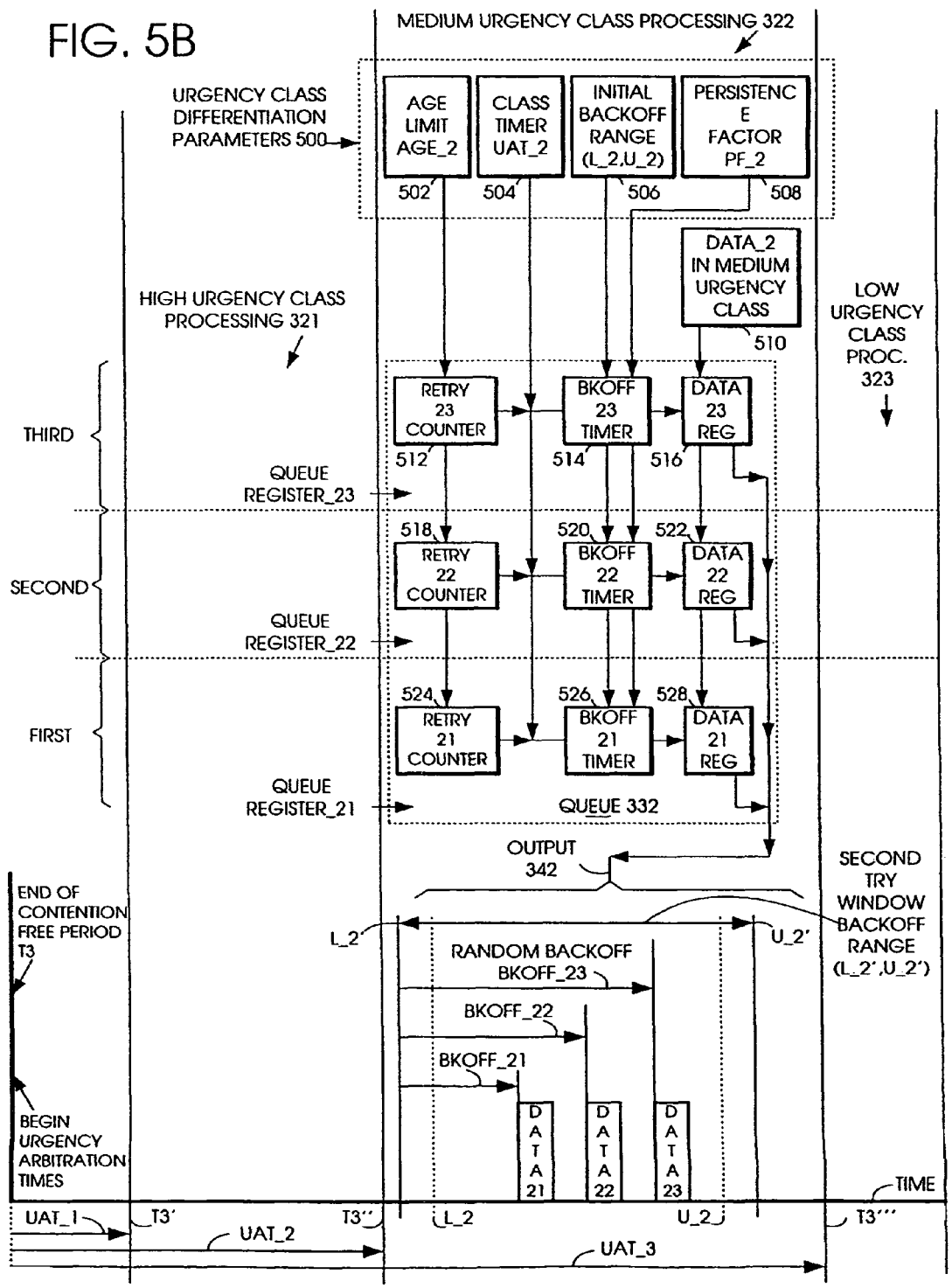
FIG. 5B is the same as FIG. 5A, but shows the resulting ordering of the transmission of data packets for the medium urgency class for a second try backoff range L_2',U_2'.

FIG. 5B is the same as FIG. 5A, but shows the resulting ordering of the transmission of data packets for the medium urgency class for a second try backoff range L_2',U_2'. If the transmission is not successful, the backoff distribution is altered before the random backoff counter is chosen for retry. The DCF doubles the backoff range (the backoff counter assumes larger values) following transmission failure. Hence, a packet is transmitted quickly in light packet traffic, but its transmission can be delayed substantially in congestion conditions. When a traffic stream requires low delay jitter, the goal is to minimize any deviation from the mean delay, which is better served if the delay is independent of packet-arrival rates.

The enhanced-DCF will employ a different discipline for different classes to adjust the backoff range when transmission fails. The initial backoff range buffer 506 provides a new backoff range (aLower[y],aUpper[y]) which will be determined by functions that depend on the packet's class, the traffic congestion estimates, which are derived by the Traffic Intensity Estimation Procedure (TIEP) in Section 4 herein, and on the time spent by the packet waiting for transmission.

These functions depend on the sensitivity of the class to delay or delay jitter. The persistence factor buffer 508 provides a persistence factor, $pf_i$, that is different for each class i, which will be used to multiply the backoff window from which backoff counters will be drawn randomly upon transmission retrial. Longer backoff ranges may be used initially for delay jitter sensitive traffic and, if transmission fails, contention persistence can be increased by shifting the backoff range to lower values for subsequent attempts. This will have the effect of postponing transmission and reducing the competition for the channel by new packet arrivals, giving a better chance to aging packets to transmit successfully. The overall delay jitter is thus minimized, making this discipline a better choice for isochronous traffic.

FIG. 7A is a network diagram of a single-cell wireless LAN 700 which has two access points 708A and 708B in the same cell. In accordance with the invention, the Tiered Contention Multiple Access (TCMA) protocol is applied to the two access points during a special preliminary contention period 735 to determine which access point will control the transmissions during a following contention-free period 716 in FIG. 7B. FIG. 7B is a timing diagram of the TCMA protocol operating in FIG. 7A, in accordance with the invention.

The single-cell wireless LAN 700 provides connectivity within radio range between wireless stations 702, 704A, 704B, 706, 708A and 708B. Access point 708A is a wireless station that allows connections via the backbone network 710A to wired network-based resources, such as servers. Access point 708A is supplied with data from a data source 734A, which has a lower QoS priority QoS(A). Access point 708B is a wireless station that allows connections via the backbone network 710B to wired network-based resources, such as servers. Access point 708B is supplied with data from data source 734B, which has a higher QoS priority QoS(B). Station 704A is supplied with data from a file transfer data source 714A, which has a lower QoS priority QoS(A). Non-real-time applications such as file transfer, Email, and data backup can tolerate greater delay. Station 704B is supplied with voice and video data from data source 714B, which has a higher QoS priority QoS(B). Voice and video applications have the most rigorous delay requirements.

Before transmitting a frame, the medium access control (MAC) layer must first gain access to the network. FIG. 7B shows three interframe space (IFS) intervals that defer a station's access to the medium and provides various levels of priority. Each interval defines the duration between the end of the last symbol of the previous frame 713 at time T1 to the beginning of the first symbol of the next frame at T2. The Short Interframe Space (SIFS) 715 provides the highest priority level by allowing some frames to access the medium before others.

The Priority Interframe Space (PIFS) 717 of FIG. 7B is used for high priority access to the medium during a special preliminary contention period 735 to determine which access point will control the transmissions during a following contention-free period 716. The point coordinator 705B in the access point 708B connected to backbone network 710B in FIG. 7A has a higher QoS priority data source QoS(B); and thus during the TCMA access point contention period 715, it seizes control of the priority-based Point Coordination Function (PCF) to dictate which stations in cell 700 can gain access to the medium. During the contention-free period 716, station 702 in FIG. 7A, for example, is directed by the access point 708B to transmit its high priority data frame 722. The point coordinator 705B in the access point 708B sends a contention-free poll frame 720 to station 702, granting station 702 permission to transmit a single frame to any destination. Station 702 wants to transmit its high priority data frame 722 to the receiving station 706. Station 702 can transmit its frame 722 during period 716 if it senses that the medium is idle. All other stations, such as stations 704A, 704B, 706, and 708A, in the cell 700 can only transmit during contention-free period 716 if the point coordinator 705B grants them access to the medium. In this example, stations 704A and 704B and access point 708A have data sources 714A, 714B, and 734A that are lower priority than the high priority data frame 722, and thus they must wait until the end of the contention-free period 716 at T3. This is signaled by a contention-free end frame sent by the point coordinator 705B. The contention-free end frame is sent to identify the end of the contention-free period 716, which occurs when time expires or when the point coordinator 705B has no further frames to transmit and no stations to poll.

The distributed coordination function (DCF) Interframe Space (DIFS) 719 of FIG. 7B is used by stations 704A and 704B, for example, for transmitting data frames 724A and 724B, respectively, during the tiered contention multiple access (TCMA) period 718. The DIFS spacing delays the transmission of frames 724A and 724B to occur between T3 and T4, later than the priority-based transmission of frame 722 sent by station 702.

An Enhanced DCF Parameter Set is contained in a control packet sent by the AP to the associated stations, which contains class differentiated parameter values necessary to support the TCMA. These parameters can be changed based on different algorithms to support call admission and flow control functions and to meet the requirements of service level agreements.

DETAILED DESCRIPTION OF THE INVENTION

In one aspect of the invention, a distributed medium access protocol schedules transmission of different types of traffic based on their service quality specifications. The competing nodes generate various types of traffic streams that may differ by their sensitivity to delay. Real-time traffic streams such as voice and video are delay-sensitive with limited tolerance for long delays. Such services can tolerate some packet loss. Music and video on demand are examples of isochronous traffic that tolerate longer delay but limited delay jitter. Their tolerance for packet loss is comparable to that of real-time traffic. Finally, data applications such as file transfers or e-mail are delay-insensitive but intolerant of packet loss. They are commonly referred to as best-effort traffic.

Because of the limited tolerance for delay, the transmission of different types of packets warrants different urgency. Each node determines the urgency class of its pending packets according to a scheduling algorithm. There are several urgency classes. The urgency class indicates the desired ordering. Pending packets in a given urgency class must be transmitted before transmitting packets of a lower urgency class. Two basic approaches can be used to impose this ordering: a backoff counter or a persistence probability.

Backoff Approach

A backoff counter is employed in the same way as in binary exponential backoff. Typically, the backoff counter is selected randomly from a range of values, referred to as the backoff window, the reason for the randomness being to avoid collisions that would occur if more than one node has packets awaiting transmission. The backoff counter is decreased when the channel is idle for a given time interval and transmission is attempted when it expires. In case of collision, the backoff procedure is repeated up to a maximum number of times, until a specified backoff range is reached. Once this occurs, the packet transmission is cancelled.

Backoff Countdown Procedures

Backoff countdown requires that the channel is sensed for a given time interval, whose specification varies in different implementations of the backoff-based collision resolution. This discussion considers two variations of the countdown procedure: the classic backoff and the backoff with preparation.

With classic backoff, the backoff counter is decreased when the channel is idle for a specified time interval, which is referred to as the backoff-counter update time (BCUT). Transmission is attempted when the counter expires. Following the transmission on the channel, a node with backoff counter equal to 1 senses the channel, which is idle. After a time interval BCUT, the node's backoff counter begins its count down and when it expires, the node transmits. Transmissions by the other nodes follow.

Backoff with preparation is a variation of the backoff described above, practiced in the IEEE 802.11 Wireless Local Area Network (WLAN) medium access control (MAC) protocol. [IEEE Standards Department, D3, supra] As in classic backoff, the backoff counter is decreased whenever the channel is idle for a time interval equal to BCUT, except immediately following a transmission. After a transmission is sensed on the channel, the duration of the idle required for backoff adjustment is longer; the channel must be idle for an additional time interval, which is referred to as the backoff-counter preparation time (BCPT), before countdown starts. Following the transmission on the channel, a node with backoff counter equal to 1 senses the channel, which is idle. The node waits for a time interval equal to BCPT, after which the countdown procedure starts. After a time interval BCUT, the node's backoff counter expires, and the node transmits; and other nodes follow. It is worth noting that classic backoff is a special case of backoff with preparation where BCPT=0. BCPT is equal to the Distributed Coordination Function interframe space (DIFS), and BCUT is equal to the slot time for the IEEE 802.11 Standard. [IEEE Standards Department, D3, supra]

As explained below, these basic procedures are followed, but with certain modifications. They involve the length of the idle time interval required before the backoff counter is decreased—called the arbitration time, the adjustment of the backoff window, and the fate of packets reaching their transmission retrial limit.

Arbitration Time Differentiation

In order to accommodate the delay intolerance of real-time traffic, the channel must be readily available upon arrival of a packet. Since transmission of a packet cannot be preempted, the channel cannot be occupied for time intervals longer than the delay tolerance of real-time traffic. This imposes a limit on the largest packet size, which is accomplished through packet fragmentation. [IEEE Standards Department, D3, supra] At the same time, it is important to reduce contention for the channel; that means one should decrease the number of nodes that attempt transmission concurrently. Finally, one should want nodes with packets awaiting transmission to be able to access the channel in the order prescribed by a scheduling algorithm; for instance, nodes with delay-sensitive traffic would access the channel, when idle, before other nodes.

The management of QoS is made possible by partitioning contention for the channel through the use of "urgency classes" for the contending nodes. Deterministic scheduling algorithms, applied to the multimedia traffic streams received at each node, place a packet in the access buffer; the buffered packet is assigned an urgency class, which is based on its traffic type and history. For example, three nodes can each receive multimedia traffic. Any of a multitude of scheduling algorithms may be chosen. For example, a scheduling algorithm could assign the top urgency classification to packets of real-time traffic, medium urgency classification to isochronous traffic, and least urgency classification to best-effort traffic. But in order to afford the greatest flexibility, urgency classification is not tied exclusively to the traffic type; it may also rely on performance parameters as they are observed in real time. For instance, a scheduling algorithm may advance packets with short remaining life to a higher urgency class. In general, it is desirable that packets generated by stations with multiple traffic types will not be disadvantaged relative to packets from stations with a single type of traffic because of a single contention point.

For simplicity of presentation, it is assumed in the ensuing discussion that at any point in time, a node is concerned with the transmission of packets of a single type. If a node generates several types of packets, scheduling procedures internal to the node will select the packet to be routed.

Contention for the channel at any point in time is restricted to members of the same urgency class, and packet transmissions are ordered according to their urgency class; hence the name "tiered contention". Partitioning of contention is accomplished through the specification of the length of the arbitration time. The arbitration time is the time interval that the channel must be sensed idle by a node before starting to decrease its backoff counter. By using a different arbitration time for each urgency class, separation of contention by urgency class is achieved. Herein, this arbitration time is called the urgency arbitration time. Ordering of transmissions by urgency classification is accomplished by assigning shorter arbitration times to the more urgent traffic. This way, lower urgency packets will not cause collisions to higher urgency packets, and will only attempt to seize the channel if there are no higher urgency packets pending transmission.

Contention Partitioning

By assigning shorter arbitration times to higher urgency packets, higher urgency packets will dominate the channel in congestion, as lower urgency packets would get less of a chance to decrease their backoff counters because of their longer arbitration time. Lower urgency packets will not cause collisions to higher urgency packets and will only be able to seize the channel if there are no higher urgency packets trying to transmit.

Collisions between packets of different urgency classes are avoided if the arbitration times are selected properly. Depending on the backoff countdown procedure employed, contention partitioning can be achieved through variation by urgency class of either of the two idle-time requirements or both of them together. In other words, the urgency arbitration time could be differentiated by one of the following: the backoff-counter preparation time (BCPT)—yielding an urgency arbitration time that is equal to $UAT_i^0$; the backoff-counter update time (BCUT)—yielding an urgency arbitration time that is equal to $UAT_i^1$; or both times—yielding an urgency arbitration time that is equal to the sum $UAT_i^0 + UAT_i^1$;. In the last case, when assigning urgency arbitration times to classes, the BCUT value chosen for a lower priority class may not be less than that of higher priority class. Then, ordering of urgency arbitration times and, hence, of classes is lexicographic with $UAT_i^0$ dominating. That is, class i has a shorter arbitration time than class j if one of the following is true: either $UAT_i^0 < UAT_j^0$, or $UAT_i^0 = UAT_j^0$ and $UAT_i^1 < UAT_j^1$. Naturally, the difference between the arbitration times of two different urgency classes must be at least equal to the time necessary for a station to discern that another station has seized the channel. One would refer to this minimal arbitration-time difference as the arbitration-time increment (AI).

In order to simplify the following discussion, arbitration time differentiation by BCPT is used.

UAT differentiation by arbitration time in TCMA works in two ways. It offers not only prioritized access to frames ready for transmission, but also retards the backoff countdown process of lower-priority frames in congestion conditions. Lower-priority frames cannot countdown their backoff if there are higher-priority frames with backoff equal to 1 waiting to transmit. This is what helps higher priority frames access the channel more readily in a minimally disruptive way, thus resulting in lower delays.

EXAMPLE

Three nodes have frames queued for transmission, one each. Node A has lower priority than nodes B and C, and hence longer BCPT. At time T0, when the busy interval is over, the residual backoff times of nodes A, B, and C are 1, 2, and 1, respectively. Following the current transmission, node C waits for a time interval equal to its BCPT, after which it starts backoff countdown. Node B does the same. The backoff timer of node C, starting at 1, will expire after a slot time. At that point the node transmits. The backoff of node B, which started at 2, has become 1 by that time. Node C, which has lower priority and, hence, longer BCPT will not be able to decrement is backoff because the channel gets busy again before it can start backoff countdown. Once the backoff of node B expires and it transmits the queued frame, channel idle time exceeds the BCPT of node A. It can then count down its backoff and then transmit its queued frame. So, even though node B has a longer backoff delay than node A, it transmits sooner because of its higher priority.

Backoff Window Adjustment and Persistence Factors

Present implementations of backoff double the backoff range (the backoff counter assumes larger values) following transmission failure. Hence, a packet is transmitted quickly in light packet traffic, but its transmission can be delayed substantially in congestion conditions. When a traffic stream requires low delay jitter, the goal is to minimize any deviation from the mean delay, which is better served if the delay is independent of packet-arrival rates. Moreover, with congestion-adaptive backoff (see below), the random backoff values used on the first transmission attempt are drawn from a backoff distribution window that is appropriate for the traffic intensity at hand. Hence, it is no longer necessary to vary the range of backoff window size widely in search of a window size that will enable successful access at the present contention level.

In view of this goal, a different discipline is used herein for adjusting the window for the backoff counter when transmission fails. While larger backoff counter values are used initially, if transmission fails, contention persistence is increased by using a "persistence factor" other than 2 to multiply the backoff window upon transmission retrial. That enables decreasing the mean of the statistical distribution from which the new backoff counter would be selected for subsequent attempts. This postpones transmission and reduces the competition for the channel by newly arrived packets, giving a better chance to aging packets to transmit successfully. The overall delay jitter is thus minimized, making this discipline a better choice for isochronous traffic. Different persistence factor values would be used for urgency classes with different sensitivity to delay.

Because of its tendency to reduce long delays, this discipline would be preferable, in congestion conditions, to decreasing backoff ranges even for real-time traffic, albeit delay-sensitive. There is a tradeoff, however, as high backoff counters postpone the transmission of the packet unnecessarily in light traffic conditions.

Congestion-adaptive, Traffic-specific Backoff

Ideally one would want to start with a backoff counter appropriate for the traffic intensity at hand and retry upon failure with successively smaller backoff counters in order to increase the persistence of aging packets. The nodes can estimate traffic intensity from the number of failed transmission attempts, both their own and those of neighboring nodes. For the latter, each node includes the number of the retrial attempts in the messages exchanged during reservation and/or in the packet headers. As each node receives these messages, it will combine them with the retrial attempts it has experienced, assess the level of congestion, and select its initial backoff window accordingly. A shorter backoff counter is needed for lower traffic intensity.

Each node selects a backoff counter randomly from a statistical distribution, whose mean and variance are set adaptively in response to the observed traffic intensity. A typical statistical distribution used for backoff is the uniform distribution; its mean is $$\frac{U+L}{2}$$

and its variance is $$\frac{(U-L)^2}{12} = \frac{x^2}{12}.$$

The variance can be adjusted by changing the window size x and the mean is adjusted by changing the minimum value L. Other choices for a distribution are also possible.

In view of the reduction of contention to nodes of a given urgency class that is achieved by using different arbitration times, it is preferable to have traffic intensity estimates by urgency class. Hence, the broadcast retrial numbers would be class specific, and a node that generates more than one type of packet would remember and broadcast several retrial numbers that would be class-specific, from which class-specific backoff counter ranges would be estimated.

The adjustment of the backoff counter distribution parameters to traffic intensity would be such that high congestion in an urgency class would increase the variance of the backoff-counter distribution, while higher intensity in classes of greater urgency would increase the mean of the backoff counter distribution.

Lifetime Limits

Congestion leads to collisions and consecutive repetitions of the backoff countdown process. In present implementations of the backoff procedure, a maximum retrial number is permitted after which transmission is cancelled. [IEEE Standards Department, D3, supra] This feature is desirable for real-time traffic, as delayed packets have little value and limited packet loss is acceptable. But for data applications, which are tolerant of longer delays but intolerant of missing packets, transmission cancellation should not be as forthcoming.

A better discipline for packet transmission cancellation would rely directly on the delay experienced by the packet since entering the MAC layer. For delay intolerant traffic, a packet would be dropped if its delay exceeds a specified threshold value; different threshold values should be used for different traffic types.

TCMA Protocol

To summarize, the mechanism for collision resolution in the TCMA proposal employs a backoff counter resident at each node contending for the channel in the same way as in binary exponential backoff, but with arbitration times and persistence factors that are differentiated according to urgency classes. In the absence of other multiple access control protocols with which compatibility is sought, TCMA is described as follows:

1. An urgency class i is assigned to the packet in the access buffer of each node according to a standardized deterministic scheduling algorithm internal to the node.
2. Each node selects a backoff counter randomly from a statistical distribution, whose mean and variance are set adaptively in response to the observed traffic intensity.
3. The parameters of the backoff-counter initial distribution are adjusted based on estimates of traffic intensity in each urgency class.
4. Congestion estimates are derived from data that include: feedback on the success or failure of a transmission attempt, the number of re-transmissions attempted by a node and by each of its neighbor nodes and from the age of such retrials. A separate number of transmission attempts is remembered or broadcast for each urgency class; and congestion is thus estimated for each urgency class. This is made possible through the introduction of new field in all reservation messages [including request to send (RTS) and clear to send (CTS)] and headers of transmitted packets indicating the number of transmission attempts. FIG. 6 is a message format diagram of a message, such as a request to send (RTS) and clear to send (CTS), or a header of transmitted packet, indicating the number of transmission attempts. Congestion is estimated for each urgency class through the introduction of this message format.
5. The backoff counter would start to be decreased when the channel is idle for a time interval equal to the arbitration time corresponding to the urgency classification. The node would attempt transmission when the backoff counter expires.
6. Upon transmission failure, new backoff distribution parameters would be computed by decreasing the mean or by multiplying the contention window by the persistence factor for the urgency classification, and a new backoff counter value would be selected from the new distribution.
7. The backoff procedure is repeated until a specified packet delay is reached, which is urgency-class specific. Once this occurs, the packet transmission is cancelled.

Compatibility of TCMA With Other MAC Protocols

TCMA can be used to combine enhanced DCF (E-DCF), a distributed contention-based MAC protocol, with other protocols both centralized and distributed.

Co-existence With a Centralized Control Protocol

Consider first a protocol with centralized control, such as the IEEE 802.11 PCF option. Two requirements are imposed by the co-existence of these two protocols: (i) a mechanism should permit the centralized protocol to gain access to the channel according to a specified priority; and (ii) once the channel is seized by the centralized protocol, control should be maintainable for the entire contention-free period, until the protocol is ready to release the channel for contention.

Access to the channel by a centralized MAC protocol is achieved by contention, a benefit of this being avoiding interference between cells. Centralized access may be given top priority by assigning the centralized protocol beacon the appropriate arbitration time. The channel will remain under the control of the centralized MAC protocol by requiring message exchanges that would cause the spacing between consecutive transmissions to be shorter than the time the channel must be idle before a station attempts a contention-based transmission following the end of a busy-channel time interval. One refers to the desired maximum spacing between consecutive messages exchanged in the centralized protocol as the central coordination time (CCT).

The PCF (or HCF) has a CCT=PIFS, the priority inter-frame space. Hence, no station may access the channel by contention before an idle period of length equal to DIFS=PIFS+1(slot time) following the end of a busy-channel time interval. It would thus be sufficient for the BCPT value used in E-DCF to be such that BCPT>CCT. Or, assuming that contention partitioning is achieved through differentiation by the BCPT values, the urgency arbitration time of a class j, $UAT_j$, would be greater than PIFS for all urgency classes j>1.

Backward-compatibility Adjustments for the IEEE 802.11 PCF and DCF

CMA can be easily calibrated for backward compatibility with the IEEE 802.11 PCF and DCF options. As described above, to be backward-compatible with the former, it is sufficient to require that the shortest arbitration time should be longer than PIFS, the priority inter-frame space. PIFS equals 30 microseconds for PHY DS and 78 microseconds for PHY FH.

As contention-based protocols, E-DCF and DCF protocol can co-exist, but the contention level and the allocation of the channel time among the nodes will depend critically on the length of urgency arbitration times that can be implemented relative to the parameters used in IEEE 802.11 DCF. Moreover, it is imperative for the adoption of E-DCF that stations employing this protocol are able to seize the channel for their highest priority classes before any legacy terminals that operate in DCF mode.

The latter implies that E-DCF must differentiate its urgency arbitration times by the backoff counter preparation time (BCPT). With BCPT lengths shorter than the backoff counter preparation time used in the IEEE 802.11 DCF mode, which is equal to DIFS, a new station operating under TCMA will be able to decrease its backoff counter faster than a legacy terminal in the IEEE 802.11 DCF mode. As packets from legacy stations would get less of a chance to decrease their backoff counters because of their longer arbitration time, high urgency packets from the new terminals will dominate the channel in congestion. The value of DIFS is 50 microseconds for PHY DS and 128 microseconds for PHY FH.

To co-exist with the centralized access protocol, E-DCF would have select values for the top urgency arbitration times between PIFS and DIFS. Enhanced stations (ESTAs) employing TCMA can co-exist with IEEE 802.11 legacy stations if the physical layer for the new stations provides for an arbitration-time increment that is compatible with the number of classes, PC, desired with urgency greater than that of legacy packets. For example, since the top urgency classes must have urgency arbitration times between PIFS and DIFS, the arbitration-time increment Al must satisfy the following requirement.

$$AI \leq \frac{DIFS - PIFS}{PC + 1} \tag{9}$$

This restriction does not apply if PCF does not rely on contention to gain control of the channel and other mechanisms are relied on to prevent contention during the contention-free period.

However, because the time in which the "clear channel assessment" (CCA) function can be completed is set at the minimum attainable for the present PHY specification, the minimum value for the arbitration-time increment AI is equal to the slot time, which is 20 microseconds for PHY DS and 50 microseconds for PHY FH.

This implies that the first priority class above legacy would be required to have an arbitration time equal to PIFS. Though this fails to make the magnitude of UATs greater than PIFS—as stated previously it is possible to prevent contention-based transmission after a PIFS idle period following a busy-channel interval.

Contention-based transmission can be restricted to occur after a DIFS idle period following the end of a busy channel period for ESTAs with urgency classification above legacy that use an arbitration time of PIFS if the following condition is met: the backoff value of such stations is drawn from a random distribution with lower bound that is at least 1. That is, the lower bound of the random backoff range, rLower, will be greater than or equal to 1 for the E-DCF urgency classes with UAT=PIFS. Given that all backlogged stations resume backoff countdown after a busy-channel interval with a residual backoff of at least 1, the soonest a station will attempt transmission following completion of the busy interval will be a period equal to PIFS+1 (slot time)=DIFS. This enables the centralized access protocol to maintain control of the channel without colliding with contention-based transmissions.

To see that backlogged stations will always have a residual backoff value of at least 1 every time they resume countdown upon termination of a busy channel period, consider a station with a backoff value m>0. The station will decrease its residual backoff value by 1 after each time slot that the channel remains idle. If m reaches 0 before countdown is interrupted by a transmission, the station will attempt transmission, which will either fail, leading to a new backoff being drawn, or succeed. Otherwise, countdown will be resumed after the busy-channel period ends, with a residual backoff of 1 or greater. Therefore, if the smallest random backoff that can be drawn is 1 or greater, ESTA will always wait for at least a DIFS idle interval following a busy period to attempt transmission.

Several classes with priority above that of legacy stations can be obtained by differentiation through other parameters, such as the parameters of the backoff time distribution, e.g. the contention window size. Backoff times for higher priority packets are drawn from distributions with lower mean values. The variance and higher moments of each distribution will depend on the traffic intensity experienced for that class. All these classes meet the requirement that a DIFS idle period follow a busy channel interval before the station seizes the channel by imposing the restriction that the backoff value of such stations be drawn from a random distribution with lower bound of at least 1.

The traffic classes with arbitration time of PIFS will have higher priority than the traffic classes with arbitration time equal to DIFS because PIFS<DIFS; (i.e. because of their shorter arbitration time). For the tiered contention mechanism, a station cannot begin to decrease its residual backoff until an idle period of length equal to its arbitration time has passed. Therefore, a legacy station will be unable to transmit until all higher-priority stations with residual backoff of 1 have transmitted. Only legacy stations that draw a backoff value of 0 will transmit after a DIFS idle period, thus competing for the channel with the higher priority stations with residual backoff equal to 1. This occurs only with a probability less than 3 per cent since the probability of drawing a random backoff of 0 from the range [0,31] is equal to $\frac{1}{32}$.

Arbitration Time for Centralized Access Protocol

Given that the arbitration time of the top urgency class for an ESTA using E-DCF to access the channel is PIFS, and in order to assign the centralized access protocol [PCF or HCF] the highest priority access and priority class, it must have an arbitration time shorter than PIFS by at least a time slot; that is, its arbitration time must equal SIFS. As in the case of the top traffic priority class for stations, the backoff values for each AP must be drawn from a range with a lower bound of at least 1. Using the same reasoning as above, the centralized access protocol will not transmit before an idle period less than PIFS=SIFS+1 (slot time), thus respecting the inter-frame spacing requirement for a SIFS idle period within frame exchange sequences. Moreover, the shorter arbitration time assigned to the centralized access protocol ensures that it accesses the channel with higher priority than any station attempting contention-based access.

Collisions, which are possible between the centralized access protocols of different BSSs within interfering range, or between stations accessing the channel by contention and a centralized access protocol, are resolved through the backoff countdown procedures of TCMA. The probability of such collisions is decreased by enabling higher priority nodes with residual backoff value equal to 1 to always be able to seize the channel before lower priority nodes.

Arbitration times have been assigned to a centralized access protocol (PCF or HCF) that co-exists with ESTAs. The centralized access protocol has the top priority, while the traffic classes for the ESTAs offer priority access both above and below that provided by legacy stations.

Table 2 illustrates the parameter specification for K different E-DCF classes according to the requirements given above. The centralized access protocol has a higher priority than the highest E-DCF priority classification, and hence the shortest UAT value. The top K-2 E-DCF classes have priority above legacy but below the centralized access protocol; they achieve differentiation through the variation of the contention window size as well as other parameters. Classes with priority above legacy have a lower bound, rLower, of the distribution from which backoff values are drawn that is equal to 1 or greater. Differentiation for classes with priority below legacy is achieved by increasing UAT values; the lower bound of the random backoff distribution can be 0.

TABLE 2

TCMA Priority Class Description

| Priority Class | Description | UAT | rLower |
|---|---|---|---|
| 0 | Centralized access protocol | SIFS | >=1 |
| 1 to k − 1 | E-DCF Traffic with priority above Legacy | PIFS = SIFS + 1(slot time) | >=1 |
| k | E-DCF Legacy-equivalent traffic priority | DIFS = SIFS + 2(slot time) | 0 |
| n = k + 1 to K | E-DCF Traffic priority below Legacy | >DIFS = SIFS + (2 + n − k) (slot time) | 0 |

Enhanced-DCF Proposal

The basic medium access protocol is a Distributed Coordination Function (DCF) that allows for automatic medium sharing according to urgency classifications assigned to transmissions through the use of the TCMA (Tiered Contention Multiple Access) method. This employs Collision Sense Multiple Access with Collision Avoidance (CSMA/CA) and a random backoff time following a busy medium condition, with certain enhancements that enable differential treatment of packets with different Quality of Service (QoS) requirements.

Class Differentiation Attributes

Differentiation between different urgency class transmissions is achieved through the use of four class-specific attributes:

(1) the arbitration time, the time used for backoff countdown deferral; (2) parameters of the probability distribution used to generate random backoff times, and more specifically, the size of the contention window from which the random backoff is drawn; (3) backoff retry adjustment functions, the simplest of which is the 'persistence factor' used in determining the size of the contention window in collision resolution; and (4) limits on the MAC-layer dwell time, serving as surrogates for packet age limits.

Like other parameter sets that are broadcast periodically by the AP in present 802.11 WLANs, the values of the above class differentiating parameters will also be broadcast by the AP in management frames. These parameter values can thus be updated periodically based on different scheduling algorithms that support a variety of functions, including but not limited to call admission and flow control functions. A service provider can coordinate, through the use of an intelligent controller, setting the values of such parameters of several APs serving a multi-BSS system in order to provide quality of service as required by the specifications of service level agreements.

Priority Differentiation By 'Arbitration Time'

Figure 8:
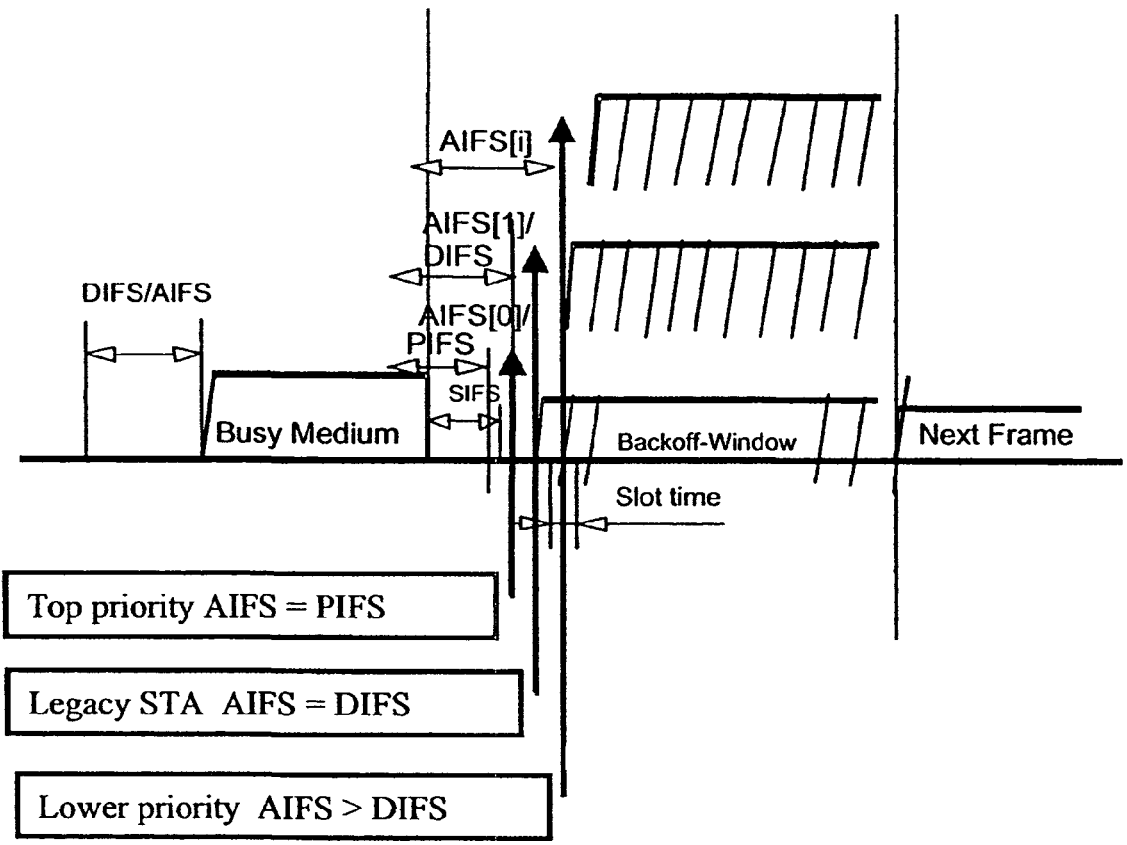
FIG. 8 is a timing diagram of priority differentiation by arbitration time.

Arbitration time is the time interval the medium must be idle before a node (or priority queue within a node) starts or resumes backoff countdown. It serves the same role as DIFS in the present standard. With TCMA, a different arbitration time is used for each priority level. A new IFS is introduced: AIFS (arbitration-time inter-frame space) is used for deferral of backoff countdown by different BCPT values, as shown in FIG. 8. Higher-priority frames have shorter AIFS.

For example, one priority traffic will have an AIFS=PIFS, the next priority level will have the same BCPT as legacy stations, namely AIFS=DIFS, and lower priority levels will have increasing BCPT length.

The TCMA protocol is designed to reduce the collision probability between enhanced stations (ESTAs) of different urgency classification accessing a medium, at the point where collisions would most likely occur. Just after the medium becomes idle following a busy medium (as indicated by the clear channel assessment (CCA) function) is when the highest probability of a collision exists. This is because multiple ESTAs could have been, and with congestion will probably be, waiting for the medium to become available again. This is the situation that necessitates use of TCMA, which relies on different arbitration times to provide prioritized access to transmissions of different classification, followed by random backoff procedure to resolve medium contention conflicts among transmissions of the same class.

Carrier sense shall be performed as in DCF. Because the time in which the CCA function can be completed is set at the minimum attainable for the PHY specification, distinct priority treatment is achieved by AIFS lengths differing by at least one time slot. The slot duration, which depend on the PHY specification, is to allow enough time for a station to sense the medium and determine whether it is busy. As a result UAT differentiation alone provides for a single "high" priority class, further differentiation in priority access is pursued through different backoff time distributions.

Backward Compatibility and Hybrid TCMA

Backward compatibility with legacy 802.11 stations requires that at least one priority class exist above legacy and that there be no access conflict between the top priority class and the point coordinator of the PCF. Differentiation by the BCUT will not provide any classes with priority above legacy if the present slot time is the shortest arbitration-time increment in which carrier sensing can be achieved. A single higher priority class is possible with pure BCPT-differentiated TCMA, having the following attributes: UAT(0)=PIFS and minimum backoff value is 1. This class does not conflict with PCs since the latter access the channel at PIFS, while the former attempt access no earlier than PIFS+1–DIFS. It is worth noting that restricting the starting backoff value suffices in avoiding conflict with a PC since any node with backoff countdown interrupted due to a transmission would resume countdown with a backoff value of at least 1. Had the backoff been 0, the node would have attempted transmission already. The contention window from which this priority class draws random backoff delays depends on traffic load.

More classes with priority above legacy can be derived through further differentiation by the contention window CW. That is, AIFS(0)=PIFS and min backoff$\geq$1. Smaller CW sizes are used for higher-priority traffic.

Dynamic Variation of Urgency Classes

There are nPC priority classes defined for all traffic packets which are permanently assigned to a packet once generated; nPC=8, according to IEEE 802.1d Annex H.2. A node may generate more than one type of packets. When a new packet is generated at a node, it joins the pool of packets waiting transmission (PWT). It is assigned an urgency class. In the most general embodiment of the invention, there are nUC urgency classes employed in contending for the channel. nPC and nUC are not equal; nUC is less than nPC and equal, for instance, to 4.

Unlike the assignment of a priority class to a transmission, and in order to afford the greatest flexibility, urgency classification need not be tied exclusively to the traffic type; it may vary in time according to the performance parameters as they are observed in real time. The capability to update the urgency class of a packet in real time can be used to reflect both the priority class of the packet and the order in which packets of different traffic classes and ages must be transmitted from a node. For instance, the scheduling algorithm will advance packets with short remaining life to a higher urgency class. For example, an isochronous application packet would be placed in the buffer with a lower urgency classification at first and then be upgraded to the same urgency as a real-time application packet if its delay approaches a critical level. This provides a mechanism for flow adaptation in order to meet reserved/negotiated QoS requirements.

Scheduling of Multiple Streams at a Station

An example of a station generating multiple traffic streams would be a PC receiving an audio-video stream and uploading data.

Packets generated by stations with multiple traffic types will not be disadvantaged relative to packets from stations with a single type of traffic because of a single contention point. Traffic generated by applications on a single station is processes as if it were generated by different stations each producing one type of frame.

Parallel queues shall be maintained within the node for each class, each adhering to backoff principles consistent with that class. That is, backoff delays will be drawn from the statistical distribution of that class and backoff countdown will occur when the channel has been idle for the duration of the UAT corresponding to that class. A separate backoff time is maintained for each queue; each counter is decremented independently of other counters in the station. The only advantage enjoyed by different-priority frames generated by applications in the same station is that they do not experience inter-queue collisions, something otherwise possible.

The queues will not be independent, however, as packets may change queues when their classifications are adjusted; their position in the new queue shall be determined by the Traffic Reclassification algorithm. The transmission of packets with excessive latency is cancelled, causing a packet to leave its queue prematurely. The limit, aAgeLimit, on the transmit lifetime, which is time from arrival at the MAC till cancellation of a packet will be class-dependent, as shown in Table 1, which lists the parameters differentiating the various urgency classes.

Each contending ESTA has access buffer of size 1. When a packet's backoff counter becomes 0, it shall be placed in the access buffer and attempt to seize the channel. In case of a tie, the access buffer packet will be selected according to the urgency classification of the tied packets. The higher priority packet will be chosen. The packet not chosen shall follow the contention resolution procedure applicable to its class; namely, it will draw a new random backoff counter and engage in backoff countdown until its backoff counter expires. If transmission of the chosen packet fails, it shall proceed in accordance with the contention resolution procedure applicable to its class.

The above discussion shows that if an ESTA generates several types of packets, scheduling procedures internal to the ESTA will select the packet to be transmitted. Thus, for simplicity of presentation, it is assumed in the ensuing discussion that at any point in time, an ESTA is concerned with the transmission of packets of a single type.

Access Procedure

The TCMA multiple access method is the foundation of the enhanced DCF. Both the DCF and the E-DCF employ CSMA/CA, with certain enhancements added for the latter to enable differential treatment of packets with different urgency classes. The operating rules differ between the DCF and the E-DCF in terms of the choice UAT, the backoff timer distribution parameters, and the retry update parameters. Table 1, above, lists the differentiating parameters for the different E-DCF classes.

UAT

The UAT (urgency arbitration time) is introduced to provide priority level access to the wireless media by the enhanced-DCF for QoS management purposes. The UAT is the time interval that the channel must be sensed idle by a node before decreasing its backoff counter. In congestion, ordering of transmissions by their urgency classification is accomplished by assigning shorter arbitration times to the more urgent traffic and separation of contention by urgency class is achieved provided that the UAT values for different urgency classes differ by at least the time needed by the carrier-sense mechanism to determine that the medium is busy or idle.

The UAT shall be used by ESTAs operating under the enhanced-DCF to transmit data. An ESTA using the enhanced-DCF shall be allowed to transmit if its carrier-sense mechanism determines that the medium is idle at the end of the UAT interval after a correctly received frame, and its backoff time has expired.

E-DCF Backoff Counter Distribution

An ESTA desiring to initiate transfer of data under enhanced-DCF will proceed as under DCF with some differences. The period of time required of the medium to be idle without interruption, as determined by the carrier-sense mechanism, is equal to UAT, a duration that depends on the data classification. After this UAT medium idle time, the ESTA shall then generate a random backoff counter, unless the backoff timer already contains a nonzero value.

The random backoff counter will be drawn from a uniform distribution with range (rLower,rUpper) where the backoff window size (rUpper−rLower), or equivalently its variance ((rUpper−rLower)**2)/2, is selected based on the traffic intensity in that class. The mean of the distribution, which is equal to (rLower+rUpper)/2, will be chosen to reflect the traffic intensity in classes of greater urgency; higher intensity in classes of greater urgency would increase the mean of the backoff counter distribution. Traffic intensity will be estimated through the Traffic Intensity Estimation Procedure (TIEP) described in Section 4. The lower bound of the random backoff range, rLower, will be greater than or equal to 1 for the enhanced-DCF classes with UAT=PIFS so that they do not collide with transmissions generated by the centralized access protocol.

Backoff Countdown

The backoff countdown will proceed under the enhanced-DCF as under the DCF. The backoff countdown is started following a time interval during which the medium is determined to be idle for the duration of the UAT after a transmission. The backoff counter is decreased by 1 for each consecutive time slot during which the medium continues to be idle.

If the medium is determined by the carrier-sense mechanism to be busy at any time during a backoff slot, then the backoff procedure is suspended; it is resumed again once the medium shall be determined to be idle for the duration of UAT period. Transmission shall commence whenever the backoff counter reaches zero.

It is important to recognize that the use by different urgency classes of UAT values different by aSlotTime minimizes the probability that packets from such classes will collide in congestion conditions; in conditions whereby several ESTAs have packets of higher classifications with nearly expired backoff counters—that is, equal to 1—the possibility of collision is eliminated. In such conditions, higher urgency packets will be transmitted before lower urgency packets. One can note, in Table 1, that this condition is met by the UAT of any of classes 1, 2, or 3 and the UAT of class 4.

Backoff Distribution Adjustment Upon Retrial

If the transmission is not successful, the backoff distribution is altered before the random backoff counter is chosen for retry. The backoff retry parameters determine how the backoff distribution parameters are adjusted on successive retries following transmission failure. The persistence factor (PF) is used to adjust the growth rate of the contention window CW size that is used upon transmission retrial. The DCF doubles the backoff range (the backoff counter assumes larger values) following transmission failure. In other words, legacy stations use a PF=2 always, as binary exponential backoff implies doubling the window size after each collision. When there is no capability for adaptation to traffic, doubling the window provides a rough way to adjust CW size to congestion. A packet is transmitted quickly in light packet traffic, but its transmission can be delayed substantially in congestion conditions.

However, when an adaptation mechanism is available to adjust window size to traffic, doubling the retrial window causes too much delay/jitter. For any offered load, there will always be a non-zero probability of collision, even when using the optimal size contention window. When a traffic stream requires low delay jitter, the goal is to minimize any deviation from the mean delay, which is better served if the delay is independent of packet-arrival rates. In the event of such a collision, a node attempting retransmission should use a shorter backoff delay than on its first, failed, attempt in order to reduce delay and jitter. Therefore, in cases where there is CW adaptation to traffic, the PF value should be<1. In general, the standard should allow flexible persistence factors.

The enhanced-DCF will employ a different discipline for different classes to adjust the backoff range when transmission fails. The new backoff range, (aLower[y],aUpper[y]), will be determined by functions that depend on the packet's class, the traffic congestion estimates, which are derived by the Traffic Intensity Estimation Procedure (TIEP) discussed herein, and on the time spent by the packet waiting for transmission. These functions depend on the sensitivity of the class to delay or delay jitter. PF can be different for different traffic clauses; a smaller PF value can be used for time-sensitive traffic, in order to achieve lower delay and lower delay jitter. A persistence factor, $pf_i$, for each class i, will be used to multiply the backoff window from which backoff counters will be drawn randomly upon transmission retrial. Longer backoff ranges may be used initially for delay jitter-sensitive traffic; and if transmission fails, contention persistence could be increased by shifting the backoff range to lower values for subsequent attempts. This will have the effect of postponing transmission and reducing the competition for the channel by new packet arrivals, giving a better chance to aging packets to transmit successfully. The overall delay jitter is thus minimized, making this discipline a better choice for isochronous traffic.

Because of its tendency to reduce long delays, this reasoning will be used, in congestion conditions, to adjusting backoff ranges for retrial even for real-time traffic, albeit delay sensitive.

EXAMPLE

The following example illustrates how the retrial backoff range can be adjusted to reflect traffic QoS characteristics. The rules for obtaining a new backoff range, (aLower[y], aUpper[y]), are the following:
with each retrial, keep aLower[y] fixed,
adjust aUpper[y] by increasing the contention window by a persistence factor pW[y] that depends on the class y, while
imposing an upper bound CWmax[y]+1 on the contention window size, which is class dependent.
Consider now two classes, one receiving voice (VO) packets that require latency not exceeding 10 ms, and the other receiving video (VI) packets with a 100 ms maximum latency limit.

The following parameters are assigned to VO:
(The restriction to be no less than 1 is imposed on the lower bound of the backoff range in order to ensure backward compatibility with legacy stations.)
UAT[VO]=PIFS
rLower[VO]=1
rUpper[VO]=15
pW[VO]=1
CWmax[VO]=15

The following parameters are assigned to VI:
UAT[VI]=PIFS
rLower[VI]=16
rUpper[VI]=31
pW[VI]=2
CWmax[VI]=127

Table 3 shows for these two classes the backoff ranges from which a random counter will be drawn on repeated transmission attempts.

TABLE 3

Backoff distribution parameters for consecutive transmission attempts

| Transmission Attempt | Class[VO] | Class[VI] |
| --- | --- | --- |
| 1 | [1, 15] | [16, 31] |
| 2 | [1, 15] | [16, 47] |
| 3 | [1, 15] | [16, 79] |
| 4 | [1, 15] | [16, 143] |
| 5 | [1, 15] | [16, 143] |

Because of its tendency to reduce long delays, this reasoning can be used, in congestion conditions, to adjusting backoff ranges for retrial even for real-time traffic, albeit delay sensitive.

MSDU-Lifetime Limits

MAC dwell-time is the time spent by a frame in the MAC layer. With the present standard that time could be excessive as no restriction is applied. The only restriction imposed currently is on the portion of the delay occurring after a packet reaches the queue head. Time-Bounded traffic is obsolete if it does not get to the recipient within a narrow window of time. As a result, excessively delayed frames, which will eventually be discarded by their application for excess delay, should not contend for the medium, causing delay to other frames. Now, an age limit leads to the cancellation of a transmission if the time since arrival at the MAC layer exceeds a threshold value. A limit is imposed on the MAC-layer dwell-time, MSDU Lifetime, which causes delayed MSDUs [all fragments] to be discarded. A benefit is that the result is reduced offered load, contention, and delay both within the same class where the limits are placed and in other classes. There is a differentiation by traffic category since time-sensitive applications use shorter MSDU lifetime limits.

Congestion-adaptive, Traffic-specific Backoff

Because it is desirable to adapt to congestion conditions in order to avoid collision in congestion and reduce the idle time in low traffic intensity, adaptation of the backoff counter to traffic intensity is pursued. It can occur at different time scales: (1) upon transmission of the packet; (2) upon transmission retrial; and (3) continuously (or whenever there is a change in traffic intensity exceeding a threshold value).

The backoff counter is drawn from a traffic-adjusted distribution the first time a packet seeks to seize the channel; the same holds when re-transmission is attempted following a collision. If the auto-correlation exhibited in bursty traffic suggests that adaptation occur in a finer scale, the backoff counter value is adjusted to traffic variation through scaling.

Upon arrival, or upon transmission retrial, if needed, a node with a packet waiting for transmission draws a backoff counter value from a traffic-adapted backoff distribution. After every silent time slot, a packet's counter is decreased and transmission is attempted upon expiration of the counter, according to the conventional procedure. If at a given time slot the traffic intensity changes, the backoff counter is scaled up or down, depending on the direction of the traffic change, as follows.

If the traffic intensity increases, then the backoff counter is increased relative to its current value. A random increment is selected from a range (0, R), where R depends on the traffic intensity change; the increment is added to the current counter value. Countdown then proceeds as before. By drawing the increment randomly, variation is introduced to the new counter values of packets that had equal counter values previously (and heading for collision), thus helping avoid collision. This way, the relative order in which pending packets will transmit is preserved and preference for transmission is given to older packets.

If the traffic intensity decreases, decreasing the backoff counter values prevents long idle channel intervals. In order to preserve the relative time ordering of packets, a random decrement that is selected from a range (0, R), which depends on the traffic intensity change, is now subtracted from the current counter value.

By preserving the order in which pending packets will transmit, the age of a packet is respected by the backoff approach while at the same time allowing for quick adaptation to traffic variation. Thus it is more likely for older packets to seize the medium before newer ones, hence keeping the latency jitter low.

Adaptation to Traffic Congestion

Consistent with the notion that the Distributed Coordination Function could remain distributed, adaptation of the backoff distribution parameters (mean and variance) will be performed in a decentralized manner, although centralized adaptation is equally feasible.

The nodes will estimate the traffic intensity from feedback information that includes: whether an attempted transmission succeeded or failed, the number of failed transmission attempts and the idle time spent waiting for transmission. For the latter, each node includes in the messages exchanged during reservation and/or in the packet headers the number of the retrial attempts and the time since arrival of the packet at the source node. The broadcast information will be class specific, from which class-specific traffic intensity estimates will be derived and class-specific backoff counter ranges shall be estimated.

When a node receives these messages, it will combine them with its own information to assess the level of congestion by the Traffic Intensity Estimation Procedure (TIEP) and select its initial backoff window accordingly. The adjustment of the backoff counter distribution parameters to traffic intensity shall be such that high congestion in an urgency class would increase the variance of the backoff-counter distribution, while higher intensity in classes of greater urgency would increase the mean of the backoff counter distribution.

The availability of class-specific traffic estimates will make it possible to start with a backoff counter appropriate for the traffic intensity at hand, and retry upon failure with properly adjusted and successively smaller backoff counters in order to increase the persistence of aging packets.

Arbitration Through Backoff-Counter Update Time (BCUT) Differentiation

Assume that arbitration is achieved through different values of backoff-counter update time (BCUT), the time that a channel must be idle for the backoff counter to be decreased. Assume here that the value of backoff-counter preparation time (BCPT) is equal to 0 for all urgency classes. Suppose the different BCUT values are given by the formula $$UAT_i^1 = h^1 + (i-1) \cdot d^1 \quad (1)$$

where $UAT_i^1$ is the urgency arbitration time for class index i, and $h^1$ and $d^1$ are two positive numbers. Suppose that after the successful reception of a transmitted packet, a lower urgency packet has a shorter remaining backoff counter, m'<m. In low congestion, low priority packets may be transmitted before high priority packets, but collision by packet of different urgency classes can always be avoided.

In order to avoid collisions it is important to ensure that the time till expiration of the backoff counter following the completion of a transmission is not equal for two packets of different classification. The following must hold:

$$m \cdot (h^1 + l d^1) \neq m' \cdot (h^1 + l' d^1) \quad (2)$$

for all possible values (m, m', l, l'), where $l' \equiv i'-1$ and $l \equiv i-1$. If the values of $h^1$ and $d^1$ are selected arbitrarily, the situations where collisions may be possible are described by the combination of values (m, m', l, l') such that $$l' > l, m' = 1, \ldots, N; m = m'+1, \ldots, N; l = 0, \ldots, C-1; l' = l+1, \ldots, C-1$$

where N is the maximum backoff counter value and C is the number of different classes. Equivalently, it is sufficient to have the following condition met:

$$\frac{d^1}{h^1} \neq \frac{m - m'}{m' l' - ml} \equiv q \quad (3)$$

Since N and C are bounded integers, the possible values of q that must be avoided comprise a countable and finite set. Hence, collisions between packets of different packets can be avoided by the proper choice of q.

Example: Suppose N=4 and C=2. Table 4 below lists the q value for all combinations of (m, m', l, l') that would be of concern. If $h^1$ and $d^1$ are selected so that their ratio is not equal to these values of q, collision between urgency classes is avoided.

TABLE 4

Arbitration through proper differentiation of BCUT

| q | m | m' | l | l' |
|---|---|----|---|----|
| 1 | 2 | 1 | 0 | 1 |
| 2 | 3 | 1 | 0 | 1 |
| 3 | 4 | 1 | 0 | 1 |
| ½ | 3 | 2 | 0 | 1 |
| 1 | 4 | 2 | 0 | 1 |
| ⅓ | 4 | 3 | 0 | 1 |

Arbitration Through Backoff-Counter Preparation Time BCPT Differentiation

Assume that arbitration is achieved through different values of BCPT, the time that a channel must be idle immediately following a transmission, before the backoff count down process is engaged. Assume here that the value of BCUT is equal to t, the same for all urgency classes. Suppose the different BCPT values are given by the formula $$UAT_i^0 = h^0 + (i-1) \cdot d^0 \quad (4)$$

where $UAT_i^0$ is the urgency arbitration time for class index i, and $h^0$ and $d^0$ are two positive numbers.

In order to avoid collisions, it is important to ensure that the following holds:

$$m \cdot t + (h^0 + l d^0) \neq m' \cdot t + (h^0 + l' d^0) \quad (5)$$

for all possible values (m, m', l, l'), $l' \equiv i'-1$, and $l \equiv i'-1$. If the value of $d^0$ were selected arbitrarily, the situations where collisions may be possible are described by the combination of values (m, m', l, l') such that $$l' > l, m' = 1, \ldots, N; m = m'+1, \ldots, N; l = 0, \ldots, C-1; l' = l+1, \ldots, C-1$$

where N is the maximum backoff counter value and C is the number of different classes. Equivalently, it is sufficient to have the following condition met:

$$\frac{d^0}{t} \neq \frac{m-m'}{l'-l} \equiv z \qquad (6)$$

As above, since N and C are bounded integers, the possible values of z that must be avoided comprise a countable and finite set. Hence, collisions between packets of different packets can be avoided by selecting the ratio to d over t not to equal any of the values of z.

Example: Suppose N=4 and C=2. Table 5 below lists the z value for all combinations of (m, m', l, l') that would be of concern. If $d^0$ and t are selected so that their ratio is not equal to these values of z, collision between urgency classes is avoided.

TABLE 5

Arbitration through proper differentiation of BCPT

| z | m | m' | l | l' |
|---|---|----|---|----|
| 1 | 2 | 1  | 0 | 1  |
| 2 | 3 | 1  | 0 | 1  |
| 3 | 4 | 1  | 0 | 1  |
| 1 | 3 | 2  | 0 | 1  |
| 2 | 4 | 2  | 0 | 1  |
| 1 | 4 | 3  | 0 | 1  |

Arbitration Through Both BCUT And BCPT Differentiation

Assume that arbitration is achieved through different values of BCUT and BCPT. Suppose the different BCUT and BCPT values are given by formulas (1) and (4), respectively.

In order to avoid collisions, it is important to ensure that the time till expiration of the backoff counter following the completion of a transmission is not equal for two packets of different classification. The following must hold:

$$m \cdot (h^1 + ld^1) + (h^0 + ld^0) \neq m' \cdot (h^1 + l'd^1) + (h^0 + l'd^0) \qquad (7)$$

for all possible values (m, m', l, l'), l'≡i'−1, and l≡i−1. If the values of $h^1$, $d^1$, and $d^0$ were selected arbitrarily, the situations where collisions may be possible are described by the combination of values (m, m', l, l') such that $$l' > l, m' = 1, \ldots, N, = m' + 1, \ldots, N; l = 0, \ldots, C-1; l' = l+1, \ldots, C-1$$

where N is the maximum backoff counter value and C is the number of different classes. Equivalently, it is sufficient to avoid values of $(h^1, d^1, d^0)$ that satisfy the following condition:

$$h^1 = \frac{d^0}{z} + \frac{d^1}{q} \qquad (8)$$

where z and q are as defined in conditions (6) and (3), respectively. Since N and C are bounded integers, the possible values of $h^1$ that must be avoided comprise a countable and finite set, given a choice of $(d^1, d^0)$. Hence, collisions between packets of different packets can be avoided by selecting the values of $h^1$ that are not in this set.

Example: Suppose N=4 and C=2. Table 6 below lists the values of $h^1$ for all combinations of (m, m', l, l') that would be of concern for a given $(d^1, d^0)$ values, say $d^0$=1 and $d^1$=1. If $h^1$ is selected so that these values are avoided, collision between urgency classes is prevented.

TABLE 6

Arbitration through proper differentiation of BCUT and BCPT

| $h^1$ | m | m' | l | l' |
|-------|---|----|---|----|
| 2     | 2 | 1  | 0 | 1  |
| 1     | 3 | 1  | 0 | 1  |
| 2/3   | 4 | 1  | 0 | 1  |
| 3     | 3 | 2  | 0 | 1  |
| 3/2   | 4 | 2  | 0 | 1  |
| 4     | 4 | 3  | 0 | 1  |

Performance of TCMA

Figure 9:
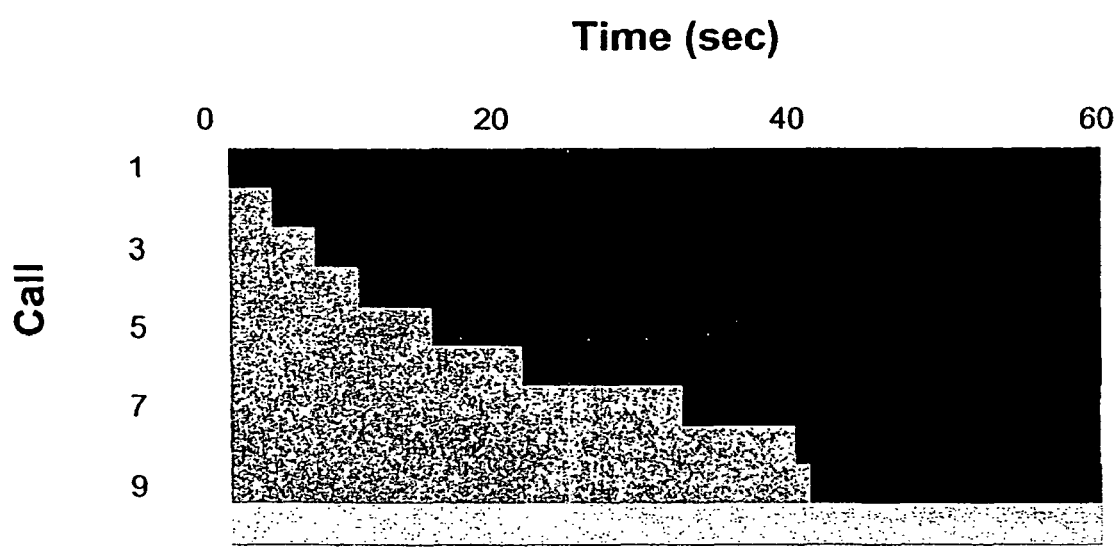
FIG. 9 is a graph of calls versus time illustrating a simulation of the performance of TCMA.
Figure 10A:
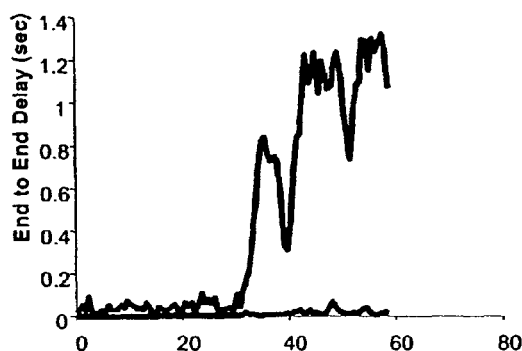
FIGS. 10A-10D illustrate the average delay by traffic category for DCF and for TCMA.
Figure 10B:
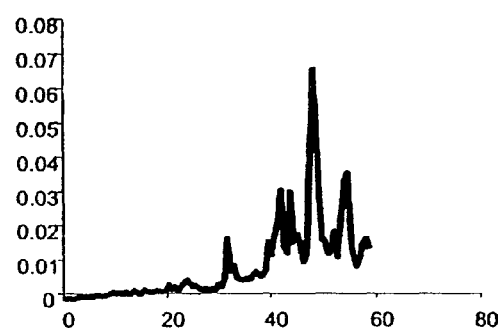
Figure 10C:
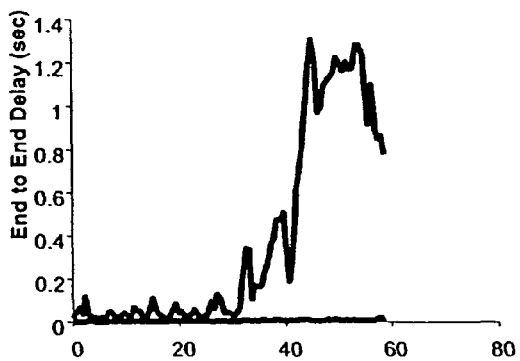
Figure 10D:
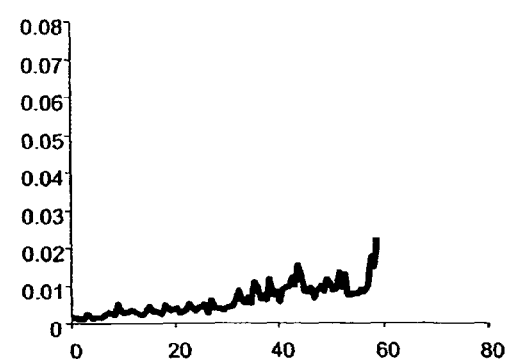
Figure 10E:
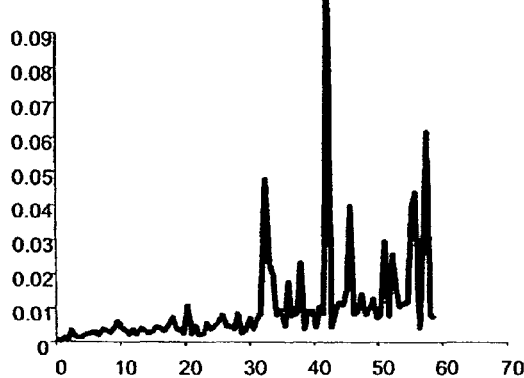
FIGS. 10E-10H illustrate delay and jitter for a single call for DCF and for TCMA.
Figure 10F:
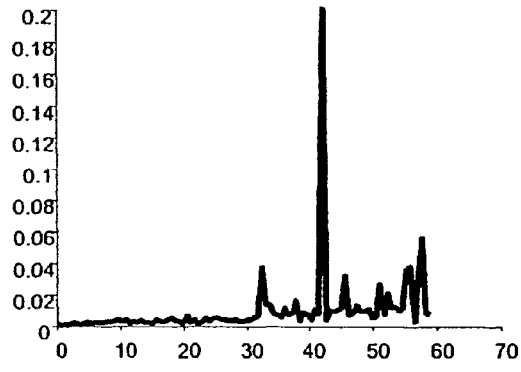
Figure 10G:
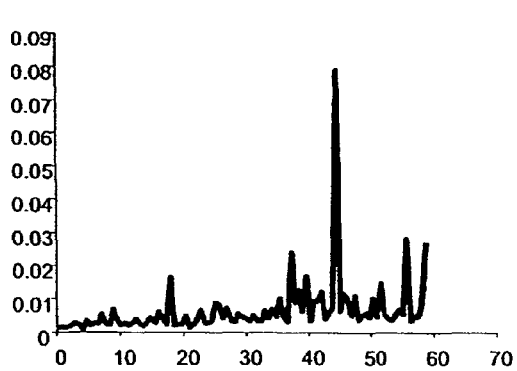
Figure 10H:
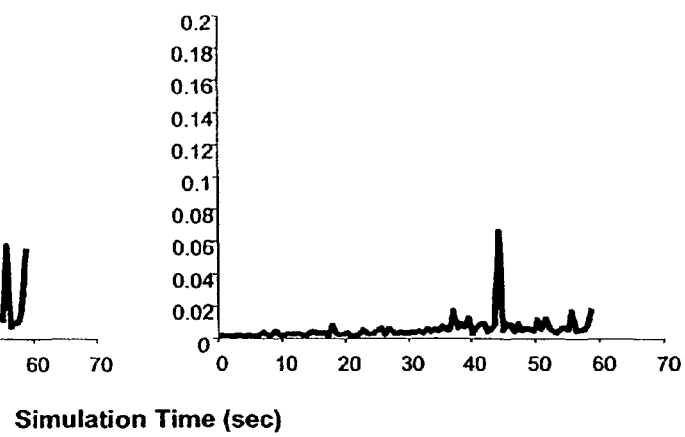

A simulation description is shown in FIG. 9.

The BSS consists of 10 bi-directional streams; 9 are voice calls and one is a very bursty high load of priority data. A DSSS channel is considered; it transmits at a 11 Mbps data rate. All nodes have a buffer size of 2.024 Mbits. The load increases as calls come on; the start of each call is portrayed.

Average delay by traffic category is shown in FIGS. 10A to 10D.

The TCMA protocol was simulated for two scenarios: (1) with the current DCF protocal and (2) with TCMA using two AIFS-differentiated priority classes. The contention window CW size was 32 both classes. The average delay is plotted for both priority classes. It decreased for both classes because of contention partitioning caused when TCMA was applied; it decreased significantly for the top-priority class.

Delay and jitter for a single call shown in FIGS. 10E to 10H.

For the same simulation, the delay and jitter are plotted for a single voice call (top-priority class). Both decreased significantly with TCMA.

Flexible Persistence Factors

Figure 11A:
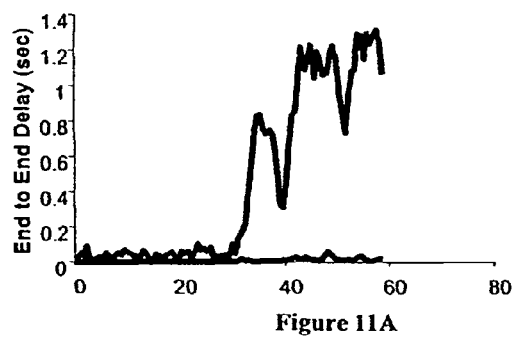
FIGS. 11A-11F illustrate the average delay by traffic category for DCF, TCMA, and TCMA with persistence factors.
Figure 11B:
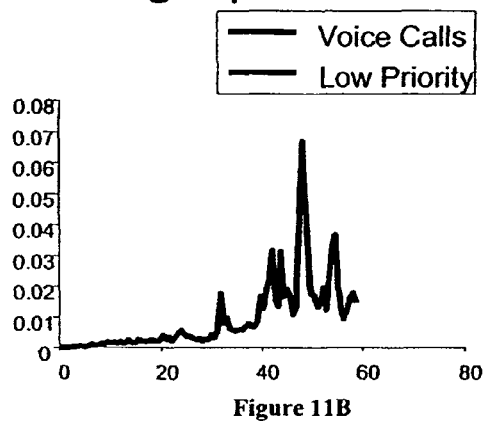
Figure 11C:
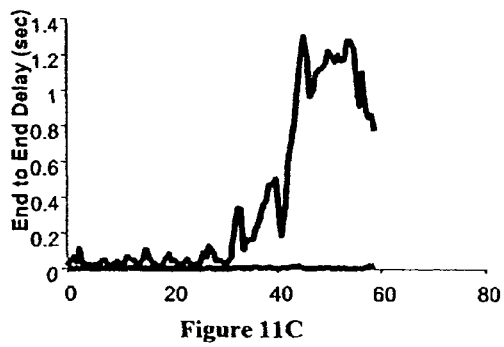
Figure 11D:
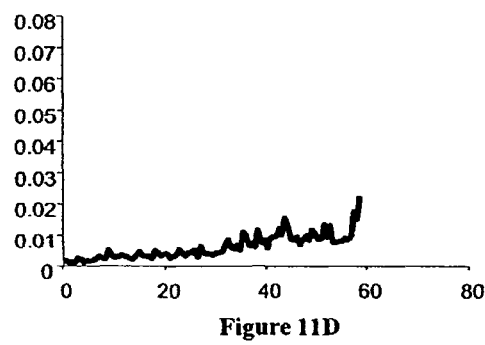
Figure 11E:
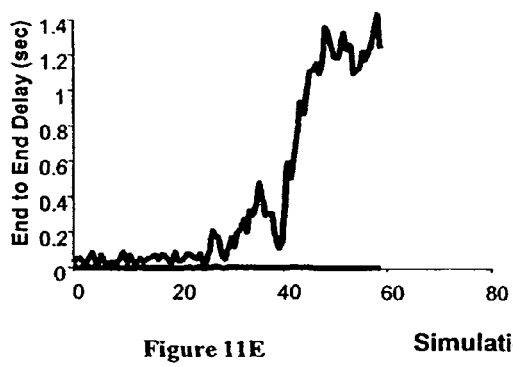
Figure 11F:
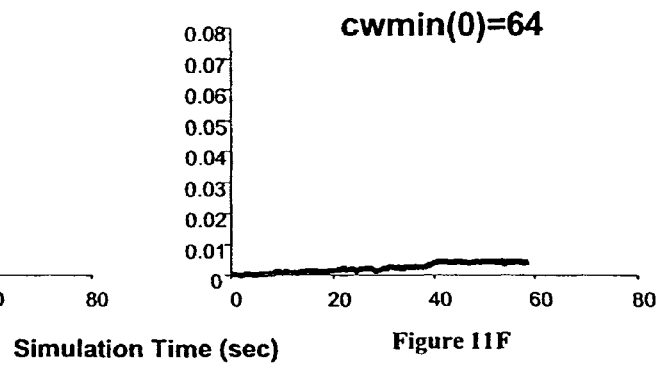

Average delay by traffic category is shown in FIGS. 11A and 11B. TCMA (AIFS Differentiation) cwmin(0)=32 is shown in FIGS. 11C, 11D. TCMA with persistence Factors: (0.5, 2) is shown in FIGS. 11E, 11F. The TCMA protocol was simulated with flexible persistence factors. First, the contention window CW size was increased for the top-priority class from 32 to 64 in order to better accommodate the contention in that class. At the same time the PF value for that class was set at 0.5. The plots show that the average delay decreased significantly for the top-priority traffic.

Figure 12A:
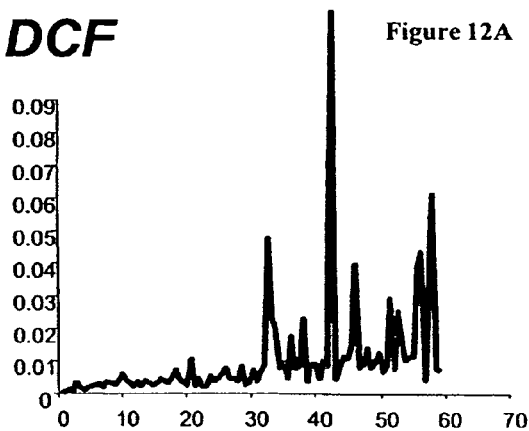
FIGS. 12A-12F illustrate delay and jitter for a single call for DCF, TCMA, and TCMA with persistence factors.
Figure 12B:
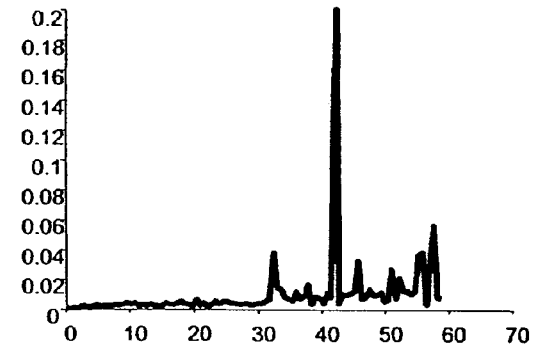
Figure 12C:
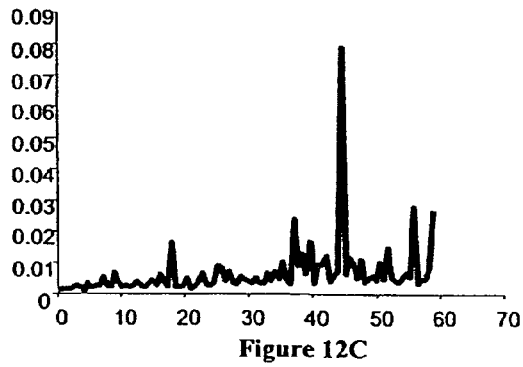
Figure 12D:
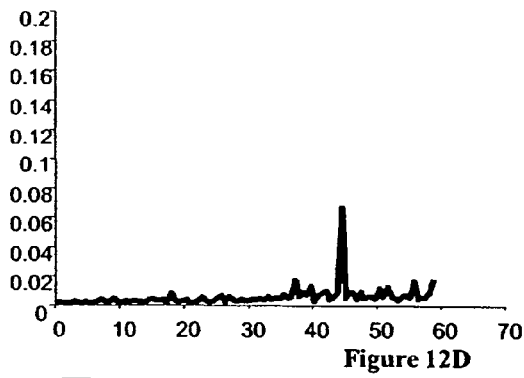
Figure 12E:
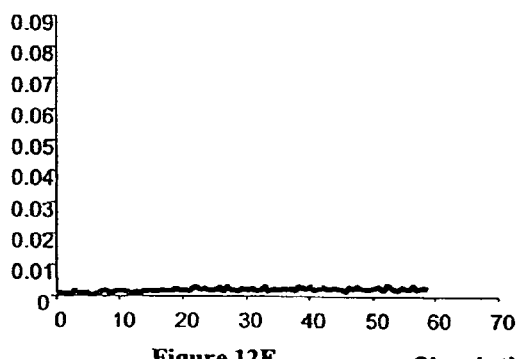
Figure 12F:
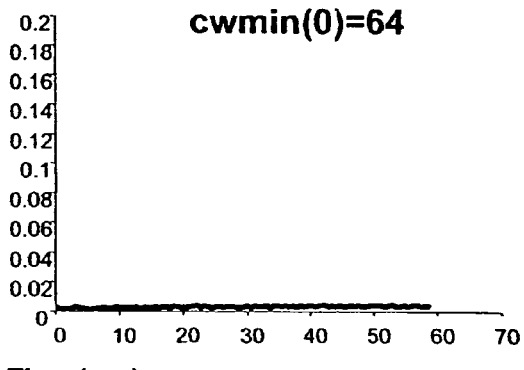

Delay and jitter for a single call is shown in FIGS. 12A, 12B. TCMA (AIFS Differentiation) cwmin(0)=32 is shown in FIGS. 12C, 12D. TCMA with Persistence Factors: (0.5, 2) is shown in FIGS. 12E and 12F.

For the same simulation, the delay and jitter are plotted for a single voice call (top-priority class). Both decreased significantly for the smaller persistence factor and wider contention window.

MSDU-Lifetime Limits

Figure 13A:
FIGS. 13A and 13B illustrate obsolete frames.
Figure 13B:

Obsolete frames [MAC dwell time>20 ms] are shown in FIGS. 13A and 13B. Delay and jitter for a single call (sec) is shown in FIGS. 13C and 13D. The TCMA protocol was simulated with a restricted MSDULifetime of 20 milliseconds, applied only to the top priority class. This scenario, shown to the right, is compared to the scenario to the left, where no frames are dropped. On top is shown the per cent obsolete frames. In the first scenario, these are the frames that are delayed by 20 ms, or longer. To the left is plotted the frames dropped because they experience delays greater than or equal to 20 ms. It is seen that the per cent obsolescence is lower in the second scenario because the channel is cleared of delayed packets. At the bottom is shown the delay and jitter for a single call. Both delay and jitter are reduced substantially.

Generalizations of TCMA

There are several extensions of the TCMA concept that apply to other media and standards. With CSMA/CA, if the channel is busy, the node will backoff by waiting a priority differential delay—the backoff delay. This delay is counted down during a period BCUT (backoff countdown update time). This time interval must be preceded by an idle period BCPT (arbitration time inter frame space). BCPT is exactly equivalent to the UAT. Either or both BCPT and BCUT is class differentiated. Shorter lengths correspond to higher priority packets.

In P-persistent CSMA

Another way backoff is effected is through the use of a persistence probability. Waiting for permission to transmit with a specified persistence probability is equivalent to selecting a backoff counter value randomly for a specified distribution. For a fixed persistence probability value, this distribution is the geometric. Given a persistence probability value (like the starting contention window with backoff), the transmission of the frame is attempted if the channel is sensed and found idle for a time slot and a random number generator determines whether permission is granted to transmit. The persistence probability may be decreased in response to collisions.

As in the case of the backoff counter, a different length arbitration time is defined for each priority class; the arbitration time is shorter for frames of higher priority. When a node has a pending frame, it determines the frame's priority class first; the priority class is then mapped into an arbitration time. Two types of arbitration times are possible: AIFS and BCUT. Following a transmission, if the channel becomes idle for the duration of the AIFS, the node checks for permission to transmit. If permission is denied, the node waits for another idle interval equal to the BCUT and checks for permission to transmit again. Transmission occurs if the channel remains idle for a BUCT interval once permission is granted. Priority differentiation can be achieved by using different AIFS values, different BCUT values, or by differentiating in terms of both BCPT and BCUT values.

One can generate several urgency classes for packets assigned the same urgency arbitration time by using different persistence probability values. A higher probability value is used for higher urgency packets.

In CSMA/CD

In other media, such as cable, nodes can transmit and receive at once. This enables the early detection of a collision, at which time transmission of the frame is cancelled. From the perspective of seeing how transmission prioritization can be effected through the UAT, one can view the 'head' of the frame as reserving the medium by contention for the remainder of the frame. Either p-persistent CSMA or CSMA/CA can be used by the frame heads to contend. Hence, UAT prioritization applies as discussed previously.

In ALOHA

When variable size packets are involved, sensing the medium is helpful in avoiding collisions. A new packet will be transmitted only if the channel is idle. In Aloha, there is no carrier sensing. New frames are transmitted immediately upon arrival without knowledge of the state (busy/idle) of the medium. If collision occurs, the node knows at the end of the transmission. A random number of slots will elapse before transmission is attempted again. The stations are referred to as backlogged stations. To prioritize ALOHA, a collided packet will be transmitted by waiting a priority differentiated delay which is selected randomly—the QoS delay (QD). The range from which QD will be drawn depends on the traffic class. There is a minimum delay Qdmin and there is the window size QDW. Higher priority traffic is assigned lower QD values; Qdmin=0 for the highest priority traffic.

In Slotted ALOHA

Slotted Aloha can be applied in a special case of traffic where packets are fixed in size and transmissions are synchronized. In that case, the state of the medium is not relevant to the fate of a new arrival. The slot time is equal to the time it takes to transmit a packet. (The unslotted Aloha allows for transmission anytime). Each station attempts transmission immediately upon arrival of the packet If two stations collide, the stations will postpone transmission, selecting another transmit slot randomly. Prioritized (slotted) Aloha can follow the same differentiation as described above.

Although a specific embodiment has been disclosed, it will be understood by those skilled in the art that changes can be made to that specific embodiment without departing from the spirit and scope of the invention.

What is claimed is:

1. A method for a distributed medium access protocol that schedules transmission of different types of packets on a channel based on a service quality specification for each type of packet, comprising:
   determining in a first wireless station a first urgency class of data having a lower quality of service priority;
   assigning a first class-differentiated urgency arbitration time to the data having the lower quality of service priority;
   determining in a second wireless station a second urgency class of data having a higher quality of service priority;
   assigning a second class-differentiated urgency arbitration time shorter than the first class-differentiated urgency arbitration time, to the data having the higher quality of service priority; and
   transmitting from the second wireless station pending packets in the second urgency class before transmitting from the first wireless station pending packets in the first urgency class, wherein each of the first urgency class and the second urgency class comprises an urgency arbitration time, an initial backoff counter, a persistence factor and an age limit.

2. The method of claim 1, wherein:
   the urgency classes each having a corresponding urgency arbitration time that must expire before starting a random backoff interval for packets assigned to that urgency class.

3. The method of claim 1, which further comprises:
   assigning a longer urgency arbitration time to file transfer data with the lower quality of service priority; and
   assigning a shorter urgency arbitration time to voice and video data with the higher quality of service priority.

4. The method of claim 2, wherein:
   the random backoff interval is calculated based on a contention window range which has an initial lower value and an initial upper value, which are functions of the urgency classes.

5. The method of claim 2, wherein:
   the random backoff interval is selected randomly from a statistical distribution, whose mean and variance are set adaptively in response to an observed traffic intensity.

6. The method of claim 2, which further comprises:
   differentiating between different urgency class transmissions with class-specific parameters of a probability distribution used to generate random backoff times and class-specific backoff retry adjustment functions.

7. The method of claim 2, which further comprises:
   differentiating between different urgency class transmissions with the persistence factor, $pf_i$, that is different for each class i, which is used to multiply a backoff window from which backoff counters are drawn randomly upon transmission retrial.

8. The method of claim 2, which further comprises:
differentiating between different urgency class transmissions with a new backoff range determined by traffic congestion estimates.

9. The method of claim 8, wherein:
the congestion estimates are derived from data that include feedback on success or failure of a transmission attempt.

10. The method of claim 8, wherein:
the congestion estimates are derived from data that include feedback on a number of re-transmissions attempted by a node.

11. The method of claim 8, wherein:
the congestion estimates are derived from data that include feedback on a number of re-transmissions attempted by neighbor nodes.

12. The method of claim 8, wherein:
the congestion estimates are derived from data that include feedback on age of retrials of transmissions attempted.

13. The method of claim 8, wherein:
the congestion estimates are derived from data that include feedback on attempted transmissions provided in reservation messages.

14. The method of claim 8, wherein:
the congestion estimates are derived from data that include feedback on attempted transmissions provided in request to send and clear to send messages.

15. The method of claim 8, wherein:
the congestion estimates are derived from data that include feedback on attempted transmissions provided in headers of transmitted packets.

16. A method for a medium access protocol that schedules transmission of packets from a plurality of nodes on a channel, comprising:
employing a backoff countdown procedure for channel access;
monitoring traffic intensity changes continuously and providing feedback to a medium access control sublayer of a plurality contending nodes;
adjusting a backoff counter of each of the plurality of contending nodes to current congestion levels in time intervals shorter than required for completion of a transmission attempt, wherein the backoff counter is a function of an urgency class comprising an urgency arbitration time, an initial backoff counter, a persistence factor and an age limit; and
adjusting the backoff counter of each of the plurality of contending nodes in a way that enables older packets to be transmitted before newer ones with high probability.

17. The method for a medium access protocol of claim 16, which further comprises:
adjusting the backoff counter of each of the plurality of contending nodes in a way that their relative ordering is preserved.

18. A method for a medium access protocol that schedules transmission of packets from a plurality of nodes on a channel, comprising:
employing, at a wireless station, a backoff countdown procedure for random channel access;
monitoring traffic continuously and providing feedback to a medium access control sublayer of a plurality of contending nodes;
adjusting parameters of a random distribution from which a backoff counter is drawn upon initiation of a transmission attempt for each of the plurality of contending nodes to reflect current congestion levels, wherein the parameters comprise an urgency arbitration time, an initial backoff counter, a persistence factor and an age limit;
adjusting, at a wireless station, a backoff counter of each of a plurality of backlogged nodes to reflect current contention levels in time intervals shorter than required for completion of a transmission attempt; and
adjusting the backoff counter of each of the plurality of contending nodes in a way that enables older packets to be transmitted before newer ones with high probability.

19. The method for a medium access protocol of claim 18, which further comprises:
obtaining traffic intensity measurements continuously and providing feedback to the medium access control sublayer of the plurality of contending nodes.

20. The method for a medium access protocol of claim 18, which further comprises:
obtaining feedback on a success status of transmissions and channel idle time continuously and providing the feedback to the medium access control sublayer of the plurality of contending nodes.

21. The method for a medium access protocol of claim 18, which further comprises:
employing feedback information to provide an estimate of an expected number of backlogged nodes; and
using the estimate for backoff-related adjustments.

22. The method for a medium access protocol of claim 18, which further comprises:
employing a wireless channel; and
monitoring the wireless channel at an access port.

23. The method for a medium access protocol of claim 18, which further comprises:
employing a wireless channel; and
monitoring the wireless channel at each of the plurality of contending nodes.

24. The method for a medium access protocol of claim 18, which further comprises:
determining system-wide adjustments at an access port; and
supplying the system-wide adjustments to all nodes.

25. The method for a medium access protocol of claim 18, which further comprises:
adjusting the backoff counter of each of the plurality of contending nodes so that their relative ordering is preserved.

\* \* \* \* \*